United States Patent [19]
Guerra

[11] Patent Number: 5,910,940
[45] Date of Patent: Jun. 8, 1999

[54] STORAGE MEDIUM HAVING A LAYER OF MICRO-OPTICAL LENSES EACH LENS GENERATING AN EVANESCENT FIELD

[75] Inventor: John M. Guerra, Concord, Mass.

[73] Assignee: Polaroid Corporation, Cambridge, Mass.

[21] Appl. No.: 08/972,778

[22] Filed: Nov. 18, 1997

Related U.S. Application Data

[63] Continuation-in-part of application No. 08/728,262, Oct. 8, 1996, Pat. No. 5,754,514.
[51] Int. Cl.$^6$ .................................................. G11B 9/00
[52] U.S. Cl. ...................... 369/275.1; 369/112; 369/116; 369/284
[58] Field of Search ................................ 369/275.1, 116, 369/284, 112, 126, 43; 356/359, 345; 359/819, 664; 250/216

[56] References Cited

U.S. PATENT DOCUMENTS

| | | | |
|---|---|---|---|
| 5,018,865 | 5/1991 | Ferrell et al. | 356/376 |
| 5,125,750 | 6/1992 | Corle et al. | 369/43 |
| 5,602,820 | 2/1997 | Wickramasinghe et al. | 369/126 |
| 5,666,197 | 9/1997 | Guerra | 356/359 |
| 5,754,514 | 5/1998 | Guerra | 369/116 |

*Primary Examiner*—Tod R. Swann
*Assistant Examiner*—Kim-Kwok Chu
*Attorney, Agent, or Firm*—Joseph Stecewycz

[57] ABSTRACT

A medium suitable for the optical storage and retrieval of information comprising a substrate, an active layer for retention of the data, and an overlying optical layer, or layers for double-sided. The optical layer serves to produce an evanescent field in or adjacent to the active layer in response to an incident beam of radiation. The evanescent field is frustrated or attenuated by the data in the active layer and produces a signal.

100 Claims, 25 Drawing Sheets

STORAGE MEDIUM HAVING A LAYER OF MICRO-OPTICAL LENSES EACH LENS GENERATING AN EVANESCENT FIELD

CROSS-REFERENCE TO RELATED APPLICATION

This application is a continuation-in-part of U.S. patent application Ser. No. 08/728,262, filed Oct. 8, 1996, commonly assigned herewith now U.S. Pat. No. 5,754,514.

BACKGROUND OF THE INVENTION

1. Field of the Invention

This invention in general relates to the field of optical recording systems and media and, in particular, to storage media comprising integral near-field optics by which means a greater resolution and storage density is attained in the processes of writing to and reading from a recording layer.

2. Description of the Prior Art

The following technical articles and authors are relevant to the present application:

Newton

McCutchen

Kino

Gaudiana, R. A., et al, High Refractive Index Polymers, U.S. Pat. No. 5,132,430, Jul. 21, 1992, assigned to Polaroid.

Guerra, J. M., "Photon tunneling microscopy," in *Proceedings from Surface Measurement and Characterization Meeting,* Hamburg, SPIE Vol. 1009, pp. 254–262, 1988.

Guerra, J. M., "Photon tunneling microscope," *Paper Summaries,* SPSE 42nd Annual Conference, Boston, pp. 11–15, 1989.

Guerra, J. M., "Photon tunneling microscopy," *Applied Optics,* Vol. 29, No. 26, pp. 3741–3752, 1990.

Guerra, J. M., "Super-resolution through Diffraction-born Evanescent Waves," *Appl. Phys. Lett.* 66 (26), p. 3555. 1995.

Guerra, J. M., Plummer, W. T., *Optical proximity imaging method and apparatus,* U.S. Pat. No. 4,681,451, Jul. 21, 1987. Assigned to Polaroid Corp.

Cronin, D. V., Guerra, J. M., Sullivan, P. F., Mokry, P. A., Clark, P. P., Cocco, V. L., *Data storage apparatus using optical servo tracks,* U.S. Pat. No. 4,843,494, Jun. 27, 1989. Assigned to Polaroid Corp.

Guerra, J. M., *Apparatus and Methods Employing Phase Control and Analysis of Evanescent Illumination for Imaging and Metrology of Subwavelength Lateral Surface Topography,* U.S. Pat. No. 5,666,197, Sep. 9, 1997. Assigned to Polaroid Corp.

Guerra, J. M., *Dark Field, Photon Tunneling Imaging System and Methods,* Patent Allowed, June, 1997.

Guerra, J. M., *Dark Field, Photon Tunneling Imaging Probes,* Patent Allowed, June, 1997.

Guerra, J. M., *Dark Field, Photon Tunneling Imaging System and Methods for Measuring Flying Height of Read/Write Heads,* Patent Allowed, June, 1997.

Guerra, J. M., *Dark Field, Photon Tunneling Imaging System and Methods for Optical Recording and Retrieval,* Patent Pending.

Guerra, J. M., *Apparatus and Methods for Providing Phase Controlled Evanescent Illumination,* Patent Allowed.

Guerra, J. M., *Phase Controlled Evanescent Field Systems and Methods for Optical Recording and Retrieval,* Patent Allowed, Sept. 1997.

N. Bloembergen and C. H. Lee, *Phys. Rev. Letters* 19, 835 (1967).

Mirabella, F. M. Jr., and N. J. Harrick, *Internal Reflection Spectroscopy: Review and Supplement,* Harrick Scientific Corp., Ossining, N.Y. 1985.

A. Yariv, P. Yeh, *Optical Waves in Crystals,* John Wiley & Sons, N. Y., 1984. Bragg reflection p. 175. Gaussian beams, p. 25. Coupled mode theory, p. 177. Coupled mode theory of Bragg reflectors, p. 194. Form birefringence, p. 205. Electromagnetic surface waves, p. 209. Guided waves and integrated optics, p. 405. Surface plasmons, p. 489. Nonlinear optics, p. 504. Phase conjugate optics, p. 549.

A. Yariv, *Optical Electronics,* Holt, Rinehart and Winston, New York (1985). p. 88, Optical resonators, like their low-frequency, radio frequency, and microwave counterparts, are used primarily to build up large field intensities with moderate power inputs. A universal measure of this property is the quality factor Q of the resonator P. Yeh, *Introduction to Photorefractive Nonlinear Optics,* John Wiley & Sons, Inc., New York, 1993.

A. Otto, "Excitation of nonradiative surface plasma waves by the method of frustrated total reflection," Z. Phys. (216), 398 (1968) and (219), 227 (1969).

Integrating optics and even micro-optics with a photo sensitive material is known in other applications not involving data storage, high spatial resolution, or even near-field integration. For example, Polavision™ film incorporated temporary lenticular lenses during production for the purpose of exposing color filter stripes on the emulsion. In the present state of the art, micro-optic elements may be added to a CCD imager so as to increase light efficiency by directing incident light away from the "dead" gate structures and into the photo-active areas. Many light detectors for light measurement or security devices use micro-optic arrays placed near the detector in order to increase the field of view of the detector.

In near-field optical applications, splitting off the total internal reflection (TIR) surface from the aplanatic immersion lens in an imaging objective and integrating it with the object to be viewed is taught in Guerra, Applied Optics 1990 and SPIE 1988, and in a flexible form (transducer) in Guerra, J. M., Flexible Transducers for Photon Tunneling Microscopes and Methods for Making and Using Same, U.S. Pat. No. 5,349,443, Sep. 20, 1994 assigned to Polaroid Corp., Guerra, J. M., Stereoscopic Photon Tunneling Microscope, U.S. Pat. No. 5,442,443, Aug. 15, 1995 assigned to Polaroid Corp, and Guerra, J. M., Method for Making Flexible Transducers for Use with Photon Tunneling Microscopes, U.S. Pat. No. 5,484,558, Jan. 16, 1996. Assigned to Polaroid Corp. Improvements and extensions of that split TIR concept are claimed and will be shown herein.

While the art describes a variety of optical storage media, there remains a need for improvements that offer advantages and capabilities not found in presently available instruments, and it is a primary object of this invention to provide such improvements.

It is another object of the invention to provide for a method of reading and writing utilizing evanescent field resolution.

It is another object of the invention to facilitate use of the near field to attain super-resolution in all axes for optical data storage reading, writing, erasing, where the data is stored as index changes (complex, may include absorption), polarization or other phase changes, topographic height changes, etc.

It is another object of the invention to fully utilize the whole-field optical capability for the purposes of: multi-tasking, multi-track encoding, faster data-transfer rates, faster random access time, more robust data through redundancy, elimination of radial actuator mechanisms, lower required disc rotation speed, higher track density through reduced cross talk in absence of Gaussian, robustness through redundancy, multi-channel encoding for higher data density, and multiple program simultaneous/interactive play.

It is another object of the invention to eliminate close-flying requirement of near-field head by miniaturizing, pluralizing, and integrating near-field optics to media.

It is another object of the invention to have better control over the flying and have a more stable near field that is integral with the medium by integrating near-field optics to the medium housing.

It is another object of the invention to improve the NA and signal-to-noise of propagating light optical data storage systems and media by integrating optical elements with the medium and/or the medium housing.

It is another object of the invention to integrate an internal reflection surface with a recording medium whereby the active layer can be protected by an overlying surface, such as a diamond-like coating, and whereby full factor of $n^2$ is retained.

It is another object of the invention to provide removable, economic high-density, near-field media.

It is another object of the invention to provide removable, economic, high-density media with integrated optics for an increase in resolution and storage density by at least a factor of n with or without near-field or an immersion medium.

It is another object of the invention to provide a medium in which interaction of an integral near-field and the integral active recording, erasable, or ROM layer is either through frustration of TIR or attenuation of TIR.

It is another object of the invention to provide a medium in which integral micro-optics are used for optical discerning of data through interference, absorption, fluorescence, wavelength, size, height, or reflection differences.

It is another object of the invention to provide a medium in which the integrated optics are formed by gradient index in a substantially planar surface.

It is another object of the invention to provide a medium in which the integrated optics are holographic optical elements (HOEs).

It is another object of the invention to provide a medium in which the integrated optics can be molded in by injection, injection compression, or compression molding.

It is another object of the invention to provide a medium in which the integrated optics may be emplaced by means of embossing with heat or solvent.

It is another object of the invention to provide a medium in which the integrated optics can be internal, external, or part of an optical window in a protective housing.

It is another object of the invention to produce a near-field in the medium such that its characteristics can be precisely controlled.

It is another object of the invention to allow full use of the attributes of the near-field, including the vertical direction, where the stability of it being integral to the medium and not dependent on flying height variations and surface topography.

It is another object of the invention to facilitate use of the said stable integral evanescent field for multilevel, multi-layer, surface plasmon, resonant near-field, diffractive near-field, phase-resolved, wavelength (spectral, fluorescence) and/or other writing and reading techniques.

It is another object of the invention to provide for an increase in resolution by illuminating the micro-optic integrated medium either inside, outside, or at the critical angle, thereby using either propagating light or evanescent near-field.

It is another object of the invention to cause an increase in illumination intensity by: forming a smaller spot, and constructive interference in the standing wave that gives rise to the field.

It is another object of the invention to place the active recording surface or ROM surface internal to the medium for data protection.

It is another object of the invention to place the micro-optics either internal to the medium or integral to a housing.

It is another object of the invention to provide the prisms in a retro-reflective arrangement such that the photo-active layer resides on all TIR surfaces.

It is another object of the invention to fill micro-prism cavities with a high index polymer of about 1.9–2.1, or to planarize with a sol-gel process.

It is another object of the invention to provide a system that can be either epi-illuminated, dark-field illuminated, or phase-controlled illuminated.

It is another object of the invention to provide a small-format system for nomadic personal digital applications.

It is another object of the invention to provide an optical storage system that rivals or surpasses the data access speed and density of non-removable hard disc drives.

It is another object of the invention to provide integral optics that by virtue of their small size reduce aberrations normally introduced by substitution of a prism for an aplanatic sphere, while enjoying the full field of the prism.

It is another object of the invention to provide, in the case of the close packed array in the window of the cassette, optics with full axis of revolution, thereby regaining factor of $n^2$.

It is another object of the invention to provide a plate, either flexible or rigid, having integral, internal, or external micro-optics in the form of a close-packed lens array that can be used for lithography and other energy delivery purposes, microscopic observation, metrology, or other in an oil-less immersion microscope that is low cost and regains large working distance, which can be used for interferometry as well as near-field depending on the NA.

It is another object of the invention to provide an integral medium that includes diffractive micro-optics which are much smaller than the wavelength and are planes in a crystal, thin film vertical layers, molecular scale polymers, phase gratings induced by holography or ion implantation or other, with the diffractive optics working alone or in tandem with refractive micro optics, said diffractive optics being 1, 2, or 3 dimensional, in order to produce evanescent fields with quasi-wavelengths much smaller than achievable with refractive index alone.

It is another object of the invention to provide two or more matched sets of diffractive optics, such that one acts as a reference and the other, when altered by light, creates interference between the two and a signal.

It is another object of the invention to encode the information from said diffractive structures in an analog form.

It is another object of the invention to encode the information from said diffractive structures in a digital form.

It is another object of the invention to provide media with integral optics that works well with staggered detector array for reduction or elimination of actuator, and subpixel resolution of data, and parallel processing.

It is another object of the invention to provide the foregoing features to any of a disc, a tape, or a photo-active layer.

It is another object of the invention to integrate light source, optics, diffraction grating, detector, into a flying head.

It is another object of the invention to take integration to its ultimate, an integrated optical chip or macro device in which is contained some or all of the following components: detector array, illumination array, total internal reflection interface, micro-optics, diffraction subwavelength optics, writeable erasable active layer, resonance layer structure, surface plasmon metal layer, phase resolution or shifting means, and so on for a true solid state storage device.

It is another object of the invention to use said integrated head in other applications, such as in lithography, in a print head in graphic arts, or as a medical sensor, or as a medical energy delivery device.

Other objects of the invention will be obvious, in part, and, in part, will become apparent when reading the detailed description to follow.

SUMMARY OF THE INVENTION

The present invention results from the observation that evanescent field, or near-field, illumination and imaging brings a number of advantages to optical data storage but the downside is that a flying near-field head is normally required, which makes removable media hard to achieve, and may be susceptible to head crashes in portable nomadic devices. Further, a flying near-field head is sensitive to topographic noise in the medium, which reduces the signal to noise available for data. Moreover, for the next-generation near-field embodiments using diffraction near-field, phase-controlled near-field, and multilevel near-field, a controlled and confined near-field is required. The present invention, therefore, integrates the near-field optics, and thus the near field itself, with the medium, so that parameters important to near-field performance can be more precisely controlled, and the medium can be made removable.

There are two general embodiments of integrating the near field with the medium. In one, the near-field optics are integrated with the cartridge. While the downside is that close-proximity flying is required as with the discrete flying head, the advantage is that the flying is more easily controlled, the flying interface is sealed within the cartridge so that the medium is easily removable, and the full $NA^2$ factor in areal density is achieved. Further, radial actuation is reduced or eliminated, with the advantages that that entails.

In the second, the near-field optics are integrated with the medium proper. The advantage is that flying is completely eliminated, and also that the near-field is very well controlled so that increases in data storage density by means of the various near-field tools used individually or in combination (diffraction, phase, multilevel, etc.) can be achieved, again in a removable medium. The downside is that only a factor of NA ratio (vs. $NA^2$) is achieved in areal density, but this is more than made up for by the increases otherwise gained. Other improvements include whole-field imaging, high SNR, among others, that are common to either.

Finally, integrating micro-optics with the medium is useful even in the propagating-light case, where modest increases in areal resolution are gained along with large increases in data transfer rates and reduced random access time from the whole-field imaging.

It is difficult for the magnetic data storage industry to achieve whole-field data storage and reading because of the nature of the magnetic read/write transducer. Even hybrids of magnetic and optical (i.e., the magneto-optical technique) suffer from the need for a physical magnetic coil. While multiple read/write arrays are in use, they cannot be placed so close as to eliminate head movement.

Optical data storage, however, can achieve whole-field capability because light passes through itself, and multiple photons can be made to exist in any density of a given space. However, the dependence upon interference as the optical contrast mechanism, and the transfer of the mindset of magnetic sequential track recording to optical recording, has missed the opportunity to capitalize on perhaps this most important feature of optical recording—the ability to image multiple tracks and whole fields at one time. This innovation, preferably with near-field but also even with propagating light, ends the forced magnetic recording restrictions on optical recording and frees it to enjoy its full potential.

Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein:

FIGS. 18 through 20A and 20B illustrate one embodiment of a method used in fabricating a storage medium comprising integral near-field optics in accordance with the present invention;

DESCRIPTION OF THE PREFERRED EMBODIMENTS

Background of the Invention

Figure 1:
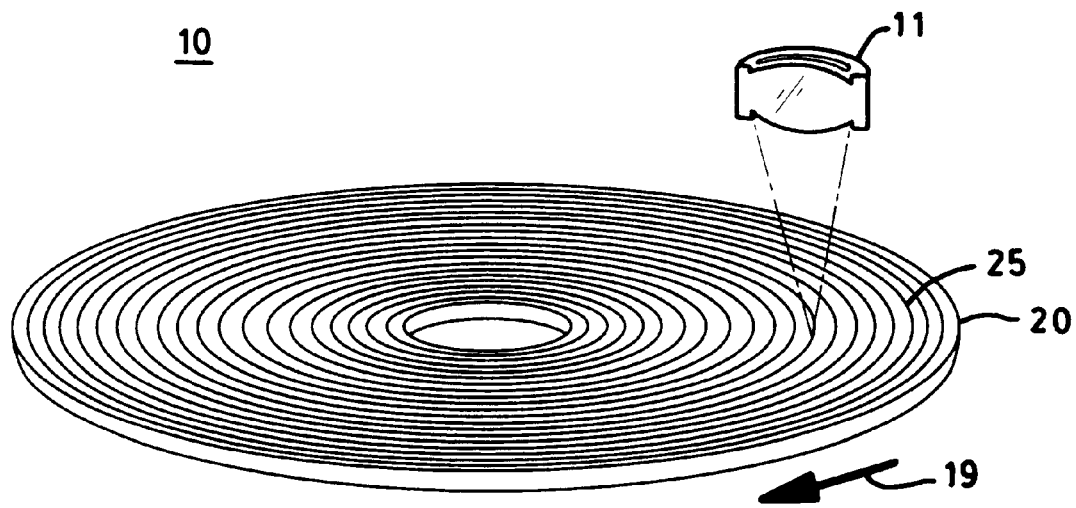
FIG. 1 is a diagrammatic perspective view of a conventional optical storage system comprising an objective lens and a medium used for data storage or retrieval.
Figure 2:
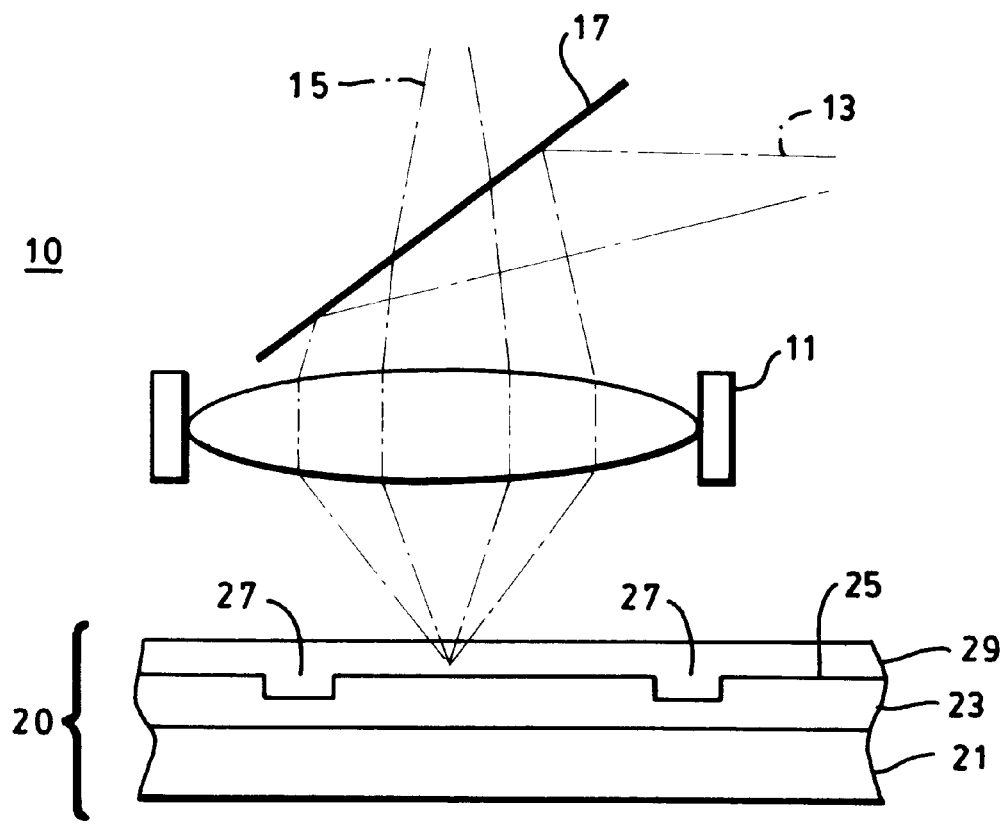
FIG. 2 is a diagrammatic elevational view of the conventional optical storage system of FIG. 1.

There is shown in FIGS. 1 and 2 a standard optical storage system 10 comprising an objective lens 11, such as found in a Digital Versatile Disc (DVD) head, and a conventional recording medium 20, such as an optical or magneto-optical recording disc. Recording medium 20 typically comprises a recording layer 23 disposed upon a substrate 21, with data recorded by means of optical artifacts 27 formed in medium surface 25 as it moves relative to objective lens 11, as indicated by arrow 19.

Recording medium 20 may further comprise a transparent protective layer 29 disposed on medium surface 25. The reading of data is accomplished by means of incident illumination 13 of wavelength $\lambda$, a portion of which is returned to a detector (not shown) as reflected radiation 15 depending on the presence or absence of optical artifacts 27. When using "epi" (i.e., "from above"), or "oblique," illumination, the resolution of a system such as optical storage system 10 is typically no greater than $$\frac{\lambda}{2NA},$$

where NA is the numerical aperture of objective lens 11, and $\lambda$ is the wavelength of the illumination. The working distance for optical storage system 10 is typically on the order of 10 mm.

The numerical aperture is given by the product of the index of refraction of the medium (in which recording layer 23 is immersed) with the sine of half of the angle that the illumination subtends in that medium. The numerical aperture is invariant (e.g., the value remains constant) when the optical path crosses a planar boundary between two medium of differing refractive indices. The numerical aperture can be increased by means of: i) increasing the subtended angle through refraction at an interface with an optical element such as a prism or aplanat, or ii) increasing the index of refraction in the immersion medium which may be the prism or aplanat, or iii) both of the former. This results in a larger numerical aperture and a correspondingly higher resolution.

Figure 3:
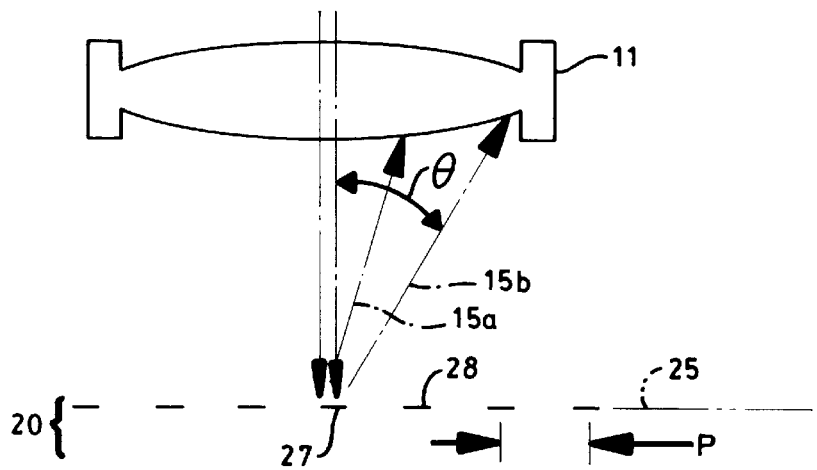
FIGS. 3 through 5 are diagrammatic elevational views of a conventional optical reader comprising an objective lens and illustrating diffraction effects resulting from increasingly smaller data artifacts.

Information in the form of optical data is typically written to medium surface 25 with incident illumination 13 provided essentially perpendicular to medium surface 25. As shown in FIG. 3, incident illumination 13 is diffracted from medium surface 25 when the size of optical artifacts 27 (i.e., data) is approximately the same as illumination wavelength $\lambda$. The diffraction angle depends on both the illumination wavelength $\lambda$ (i.e., a longer wavelength results in a larger diffraction angle) and the spatial period of the data (i.e., a smaller spatial period results in a larger diffraction angle). The spatial period of the data is the center-to-center separation "P" of optical artifacts 27 as shown.

For the data to be resolved and measured, such that a first optical artifact 27 is distinguishable from a neighboring artifact 28, it is required that: i) objective lens 11 be sufficiently large in diameter (or in numerical aperture) to intercept at least a first order diffraction 15b, at the minimum diffraction angle $\theta$, and ii) there be sufficient intensity difference between first optical artifact 27 and neighboring artifact 28 for first optical artifact 27 to be visible (i.e., modulation is present). First order diffraction 15b combines with a zeroth order diffraction 15a to form an image. (This description follows the diffraction theory of image formation for a microscope in accordance with Abbe and Zernike). Interception of even higher orders, if present, serves to contribute to image quality. The numerical aperture can also be thought of as the bandpass which allows only certain spatial frequencies to pass. (It should be understood that, in the examples provided, illumination perpendicular to the recording surface is shown for purposes of clarity and that practice of the invention is not limited to such perpendicular illumination. Oblique illumination, when used, allows the second order diffraction (not shown) into the numerical aperture for about a factor of two better resolution.)

Figure 4:
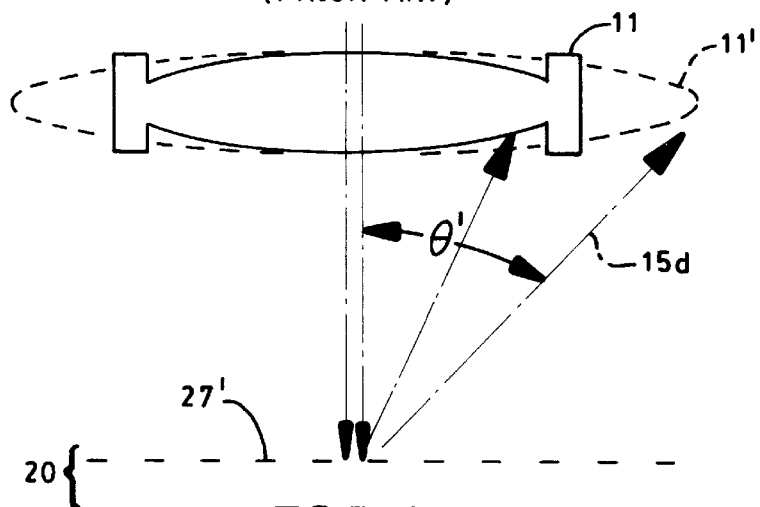

As the density of stored information is increased, it becomes necessary to utilize a smaller optical artifact 27' in the process of writing to or reading from recording medium 20, as illustrated in FIG. 4. The separation between optical artifacts 27' is correspondingly decreased as well. However, because diffraction angle $\theta'$ has increased, objective lens 11 here does not intercept first order diffraction 15d. One solution is to use a larger objective lens 11' (indicated by dotted lines). As is well-known in the relevant art, storage density increases as the factor $NA^2$ (i.e., the square of the numerical aperture). In the conventional DVD optical storage system, for example, the objective lens used has an NA of 0.65 rather than the conventional NA of 0.4 so as to provide for an increase in storage density. However, this approach results in an increase in cost and more critical tolerances resulting from a shallower depth of field.

Alternatively, decreasing the wavelength of incident illumination 13 will decrease diffraction angle $\theta$ such that first order diffraction 15d intercepts objective lens 11, and optical artifacts 27' are resolved. As can be appreciated by one skilled in the relevant art, the search for an illumination source of ever shorter wavelength will continue in view of the fact that storage density can be increased in proportion to the square of the ratio of conventional (e.g., red) wavelength to a shorter (e.g., blue) wavelength.

Figure 5:
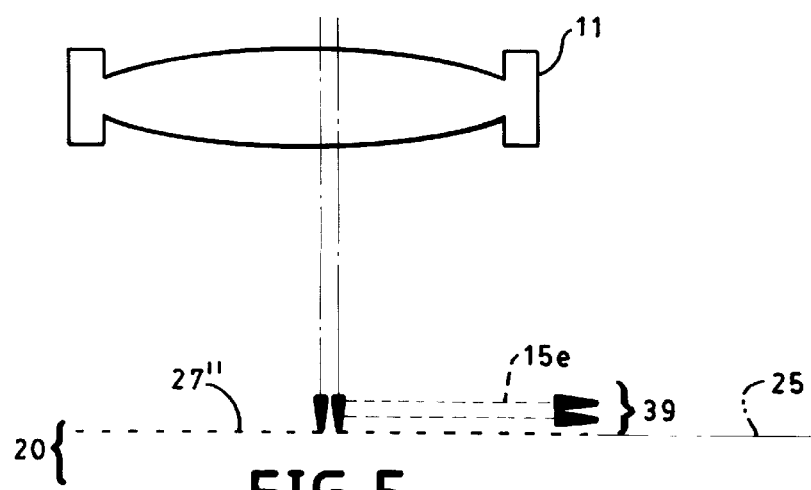

As the density of stored information is further increased, an even smaller optical artifact 27" is utlilized in the process of writing to or reading from recording medium 20, as illustrated in FIG. 5. A first order diffraction 15e results and is parallel to medium surface 25. This diffracted illumination is in the form of an evanescent field 39, or near-field. This non-propagating, non-radiating illumination does not leave medium surface 25. As is understood by one skilled in the relevant art, the amplitude of the illumination decreases exponentially with distance from medium surface 25. For still smaller optical artifacts, the exponential decay is more rapid.

Figure 6:
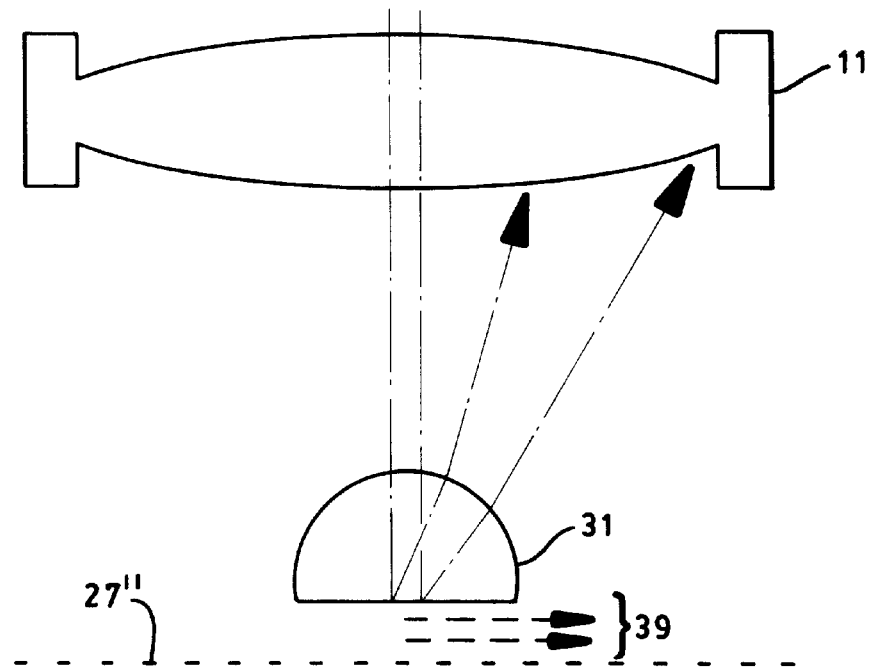
FIG. 6 is a diagrammatic view of the optical reader of FIG. 5 employing an aplanatic lens to increase the resolution.

FIG. 6 illustrates the use of an aplanatic sphere 31 in combination with objective lens 11 for the detection of artifacts 27" by means of evanescent field 39. Numerical aperture and resolution are defined and determined by the extreme ray in the illumination cone. For a "pure" spatial frequency object as substantially embodied by the diffraction grating formed by the optical data tracks, the first and primary diffracted order angle can be made to coincide with the extreme ray of the numerical aperture, which allows the optical approximation of the aplanatic sphere with prismatic elements, such as an array of prism micro-optics.

Figure 7:
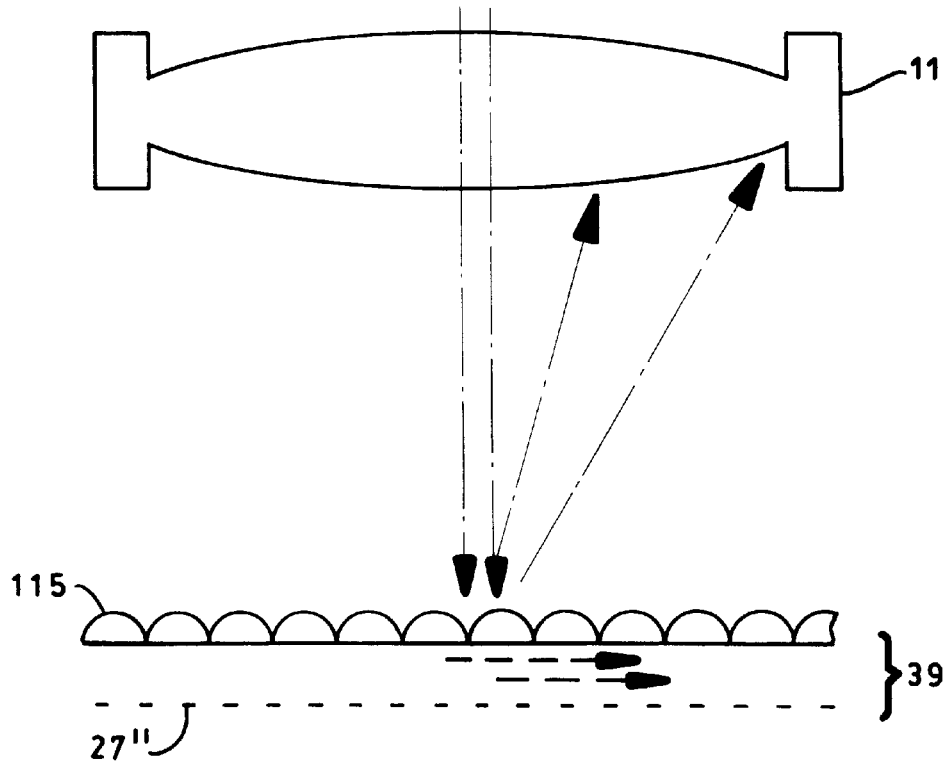
FIG. 7 is a diagrammatic view of an optical reader, in accordance with the present invention, comprising an optical layer disposed upon the surface of a data storage medium.

FIG. 7 illustrates the use of an array of prismatic elements 115 in conjunction with objective lens 11 to provide for detection of artifacts 27" by means of evanescent field 39. The resulting field of view is improved over the aplanat configuration as each prismatic element 115 allows every part of the active optical layer occluded by its base to be viewed. In comparison, the aplanat configuration allows only the central 50 to 75% of the underlying active optical area to be viewed. The aplanat has the better resolution, however, because it is optimized to eliminate spherical aberration. Therefore, the aplanat is preferred, in either its lenticular form or its close-packed two-dimensional form for use in a configuration integral to a housing (discussed in greater detail below). In such configurations, the fields of view of adjacent aplanatic optical elements can be made to overlap, forming an essentially complete field of view with little or no loss of recording capability or real estate.

The two-dimensional aplanat increases the areal storage density by the square of the ratio of the increase in numerical aperture NA. The lenticular aplanat, on the other hand, increases the areal storage density in the track pitch dimension by only the ratio of the increase in numerical aperture compared to the objective without the integral micro-optic. As can be appreciated by one skilled in the relevant art, an aplanat configuration is not the preferred choice for integration with the medium proper because of the loss of field of view, and a prism form would be used. From an optical standpoint, this is acceptable because, given the micro scale of the optics, the aberrations introduced by the planar facets of the prism are minimal compared to the curved surface of the aplanat. Only the first order diffraction from the spatially pure optical data structure is required, and it easily passes from prismatic element 115 to objective lens 11.

Figure 8:
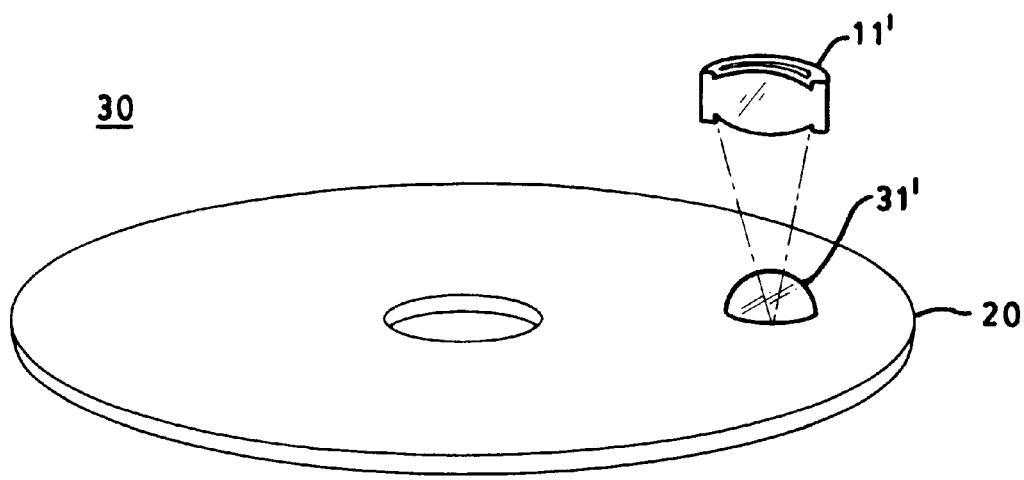
FIG. 8 is a diagrammatic perspective view of the conventional reader of FIG. 6.
Figure 9:
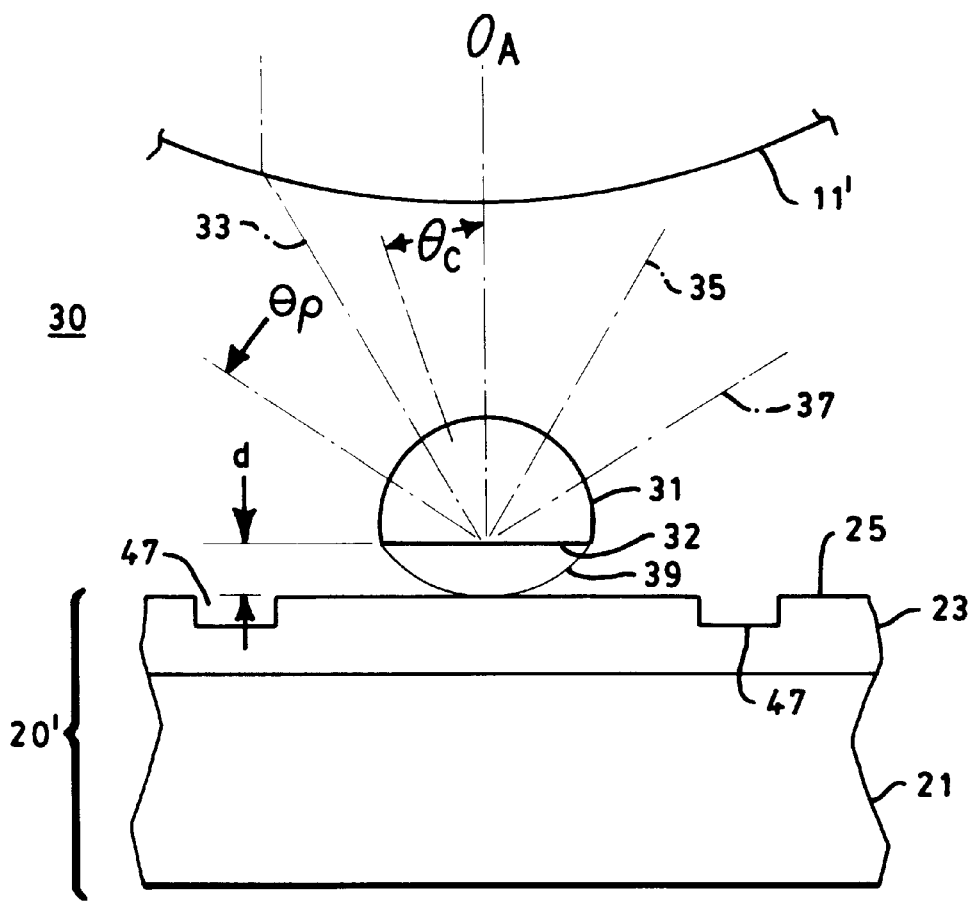
FIG. 9 is a diagrammatic elevational view of the conventional reader of FIG. 6.

It has been proposed that resolution can be increased with a configuration such as that exemplified by a near-field optical storage system 30, shown in FIGS. 8 and 9, comprising an objective lens 11' and an aplanatic sphere 31 having a substantially planar surface 32 positioned at a distance "d" from medium surface 25 of a conventional recording medium 20'. Because the illumination wavelength $\lambda$ is reduced by a factor equal to the index of refraction of aplanatic sphere 31, the resolution of optical storage system 30 is increased over that of optical storage system 10 such that proportionately smaller optical artifacts 47 can be read. Incident illumination 33 is directed into aplanatic sphere 31 at an angle greater than critical angle $\Theta_C$ (here measured relative to an optical axis normal denoted by $O_A$). An evanescent field 39, generated at surface 32, provides for the operation of optical storage system 30.

Incident illumination 33 is totally internally reflected at surface 32 to emerge as either totally-reflected radiation 37 or frustrated to produce propagating radiation 35 by the process of, for example, absorption, refraction, diffraction, or scattering, by optical artifacts 47 present in recording layer 23. In practical applications, "d" is less than a wavelength $\lambda$. Accordingly, there is typically provided little or no protective layer in recording medium 20' so as to enable placement of aplanatic sphere 31 at the requisite distance. Where a protective layer is used, this is commonly done solely to prevent oxidation of, for example, magneto-optical (MO) surfaces. Because the illumination wavelength $\lambda$ is reduced by a factor equal to the index of refraction of aplanatic sphere 31, the resolution of optical storage system 30 is increased over that of optical storage system 10 such that proportionately smaller optical artifacts 47 can be read.

Optical storage system 30 incurs several disadvantages when operating as a dynamic system in which there is relative movement between aplanatic sphere 31 and recording medium 20. Most problematic is that the operations of reading and writing are adversely affected by the presence of contamination on medium surface 25 because the flying height of aplanatic sphere 31 is made to exceed the sensible extent of evanescent field 39. This may require that optical storage system 30 be a costly, sealed system. Additionally, because there is no protective layer, active layer 23 is exposed to ambient atmosphere and is vulnerable to oxidation or head crashes.

Propagating and Evanescent-Field Illumination:

With propagating illumination, the highest NA possible at a medium (e.g., greater than one and typically as high as 1.25) is achieved in the case where the micro-optic array is directly on the medium. For a split flying integrated micro-optic (described below) and with propagating illumination, an NA of approximately 0.95 can be realized with a flying height much larger than for the near-field case. In either case, propagating illumination requires a contrast mechanism such as interference or polarization analysis, for example, to detect the optical data. The evanescent field micro-optic enjoys an NA of greater than one and typically about 1.25 or more, and also brings all the attributes of near-field illumination to bear, as discussed in greater detail below.

Figure 10:
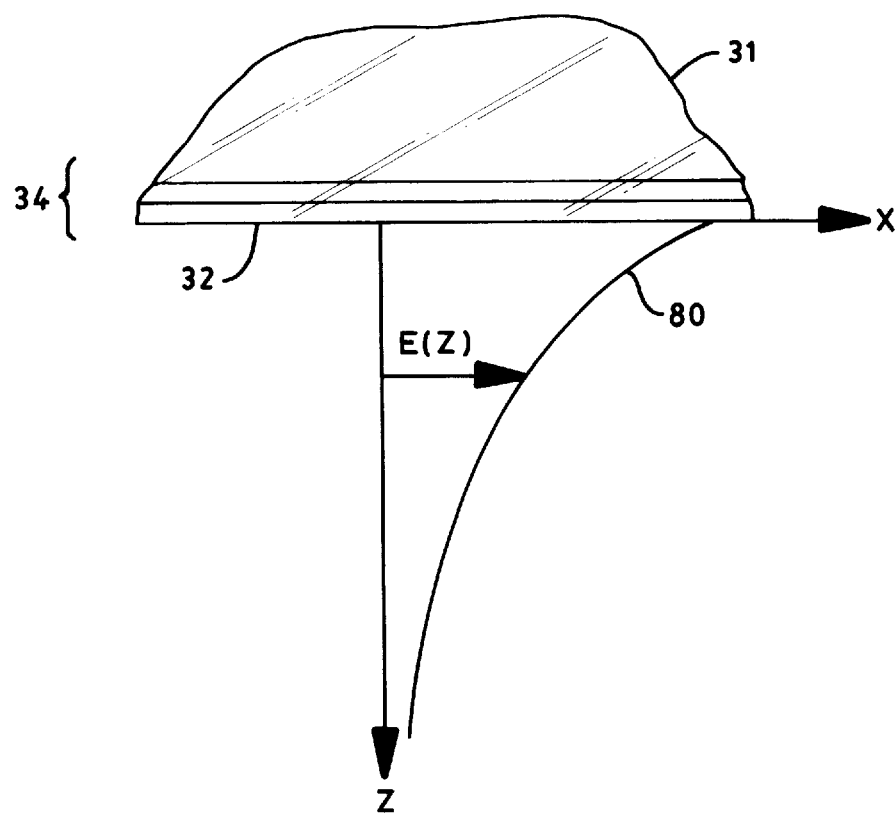
FIG. 10 is an illustration of the intensity of an evanescent field emanating from a reflecting surface.
Figure 11:
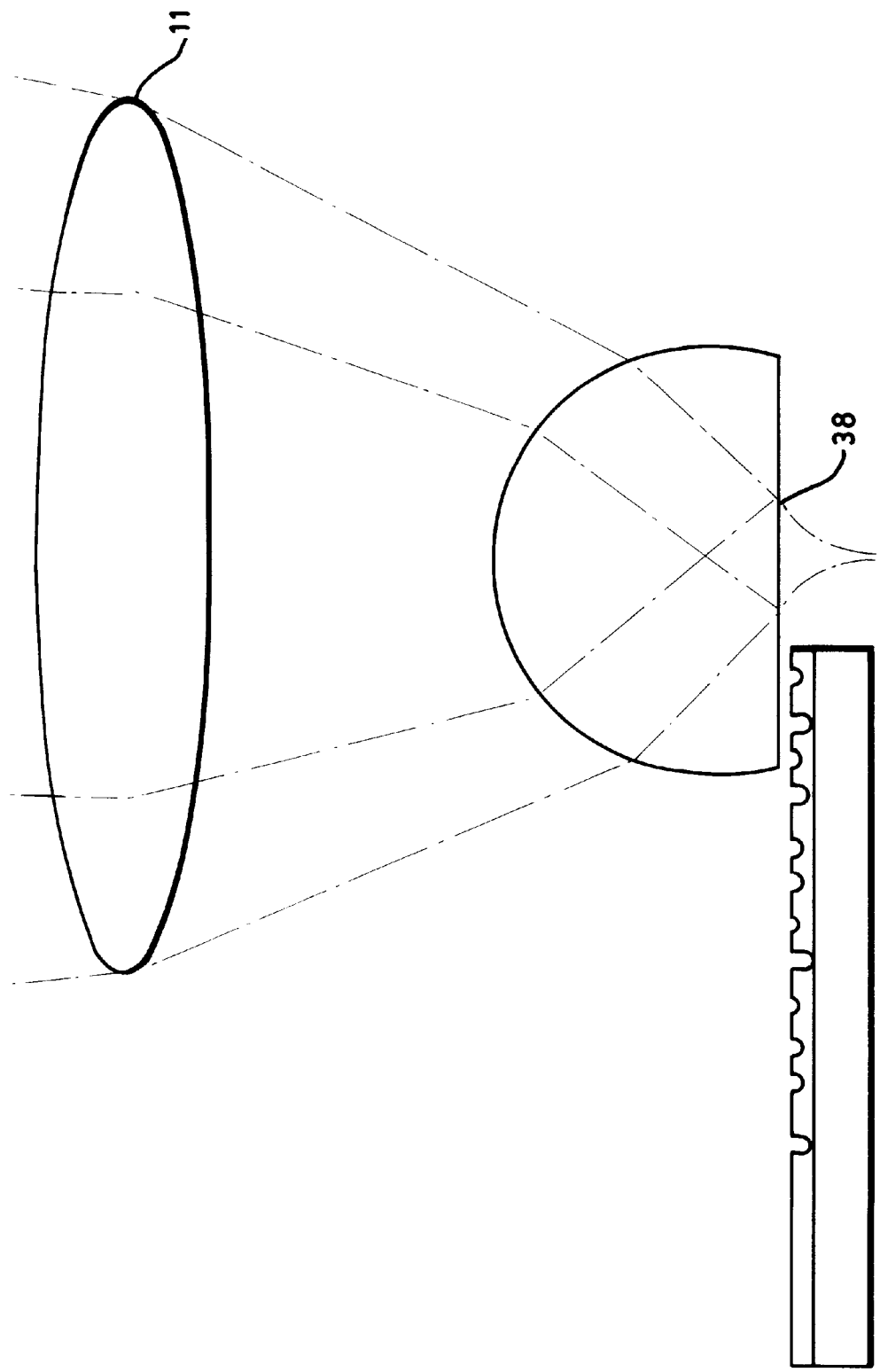
FIG. 11 is a diagrammatic representation of the evanescent field of FIG. 10.

As shown in the diagram of FIG. 10, an evanescent field, having an intensity described by graph 80, arises at the boundary between surface 32 and the adjacent lower index medium (usually air or another low-index medium). Evanescent field 80 is a continuation of the internal standing wave in aplanatic sphere 31 that in turn is a result of constructive interference of incident and reflected illumination at surface 32 (i.e., the TIR interface) that gives rise to evanescent field 80. Therefore, immediately at the active layer or low-index side of surface 32, the resultant intensity 38 can be four times as much as the intensity of incident radiation (see FIG. 11). Because of this higher intensity, less sensitive active layers, lower power sources, or lower cost sources can be used in the associated optical storage system. For writing, the power levels provided by coherent laser diodes may still be desirable for presently-available active optical materials.

"Near-field" is traditionally understood to include both propagating and non-propagating radiation near (i.e., within a wavelength of) a surface. The non-propagating field is also known as an evanescent field, comprised of inhomogenous or surface bound waves. The evanescent field arises in the condition of total internal reflection (TIR) at a boundary between a high and low refractive index media, where the parent field in the higher index medium penetrates into the lower index medium (i.e., the refraction angle becomes imaginary). Because the time average of this penetration of energy (represented by the Poynting vector) is zero, total reflection is indicated. In the quantum mechanical view, this penetration of the TIR barrier is called photon tunneling. Evanescent fields also arise in other situations, such as when propagating illumination is diffracted by a grating with grating period smaller than the wavelength, discussed below, such that the diffracted orders are evanescent (i.e., the diffraction angle becomes imaginary).

For p-polarized coherent illumination at the critical angle $\theta_C$ and for total reflection:

$$\theta_C = \sin^{-1} n_{21} \quad (1$$

where $n_{21} \equiv n_2/n_1 \equiv N$, the ratio of the indices of refraction in medium 2 and medium 1, respectively, the reflected beam is shifted in phase by $\pi$, as with reflection by a perfect conductor. (In fact, the total reflection surface can be treated as a lossless metal.) Littman showed that, for an absorbing rarer medium, there is no longer a particular angle for total reflection, but a transition of finite angular width. Accordingly, it should be understood that for the present application, when the active layer is an absorber, reference to the critical angle takes into account this finite angular width. Many physical optics textbooks (e.g., Born and Wolf) proceed from Maxwell's equations to show that standing waves are established normal to this totally reflecting surface, internal to the denser medium, because of the superposition of the incoming and reflected waves. This results in a net field at the surface in the rarer medium, normal everywhere to the surface in the Z axis, with intensity E due to coherent addition (net) of the incident and reflected beams, evanescent wavelength $\lambda_e$ and phase angle $\alpha$:

$$E = 2 \cos(2\pi z/\lambda_e + \alpha) \quad (2$$

Evanescent field 80 has an amplitude that decays exponentially with distance from surface 32. The strength of available evanescent field 80 is given by:

$$E_{evanescent} = E_0 e^{\left(-\frac{z}{d_p}\right)} \quad (3$$

where $E_o$ is the phase dependent amplitude of the electric field associated with the photon in the medium comprising aplanatic sphere 31 and, $d_p$, is the penetration depth in the less dense medium at which $E_o$ decreases to $E_o/e$ and where:

$$d_p = \frac{\lambda_1}{2\pi(\sin^2\theta - n_{21}^2)^{\frac{1}{2}}} \quad (4$$

and $\lambda_1$ is the wavelength in the denser medium, $\theta$ is the incidence angle, and $n_{21}$ in the ratio of denser to lower indices of refraction at the boundary surface 32. The actual penetration depth, where $E_{evanescent}$ falls to the limit of detectability, is dependent on these variables as well as both the photodetector sensitivity and the sample optical properties, and is typically approximately 0.75. However, the evanescent field, however small in intensity, can exist sensibly for tens of wavelengths, if the parameters in equation (2) are optimized. The evanescent field has electromagnetic field vectors in all spatial directions, so that coupling is made to dipoles in any spatial orientation. This fact is used to advantage in spectroscopy and also here, in optical data storage, for more efficient coupling into the active layer.

The evanescent field can exist in the active optical layer. In the relevant art, this is denoted as attenuated total reflection (ATR). Alternatively, the evanescent field can exist adjacent to the active optical layer, denoted as frustrated total reflection (FTR or FTIR). In either case, the evanescent field is partly or totally converted into propagating illumination by the active optical layer, which then forms an image. Both ATR and FTR, as well as propagating, are claimed in the present invention in combination with micro-optics integral to the medium.

If evanescent field 39 can be accessed and converted back into propagating illumination so that it contributes to image formation, it follows that optical artifacts of a size much smaller than illumination wavelength λ can be resolved. To access this evanescent field requires close proximity to the medium surface because evanescent field 39 decays over a distance of only a fraction of a micron—hence the term "near-field." Moreover, the smaller the size of the optical artifacts, the smaller the required distance to the medium surface.

To convert evanescent field 39 back into propagating, it is required that one is close to the surface with: i) a high-refractive index dielectric material, or ii) a diffraction grating with grating period similar in size to the otical artifact spatial period. The more evanescent the field (i.e., the smaller the optical artifacts), the higher the refractive index that is required. Ultimately, there is a practical limit (imposed by the index of refraction of available materials) of about 2.4 in the visible spectrum to about 3.5 in the near infra-red spectrum. Conversion by diffraction is limited only by the diffraction grating spatial period. In the present state of the art, for example, a diffraction grating spatial period of less than 40 nanometers has been achieved.

Figures 12A, 12B:
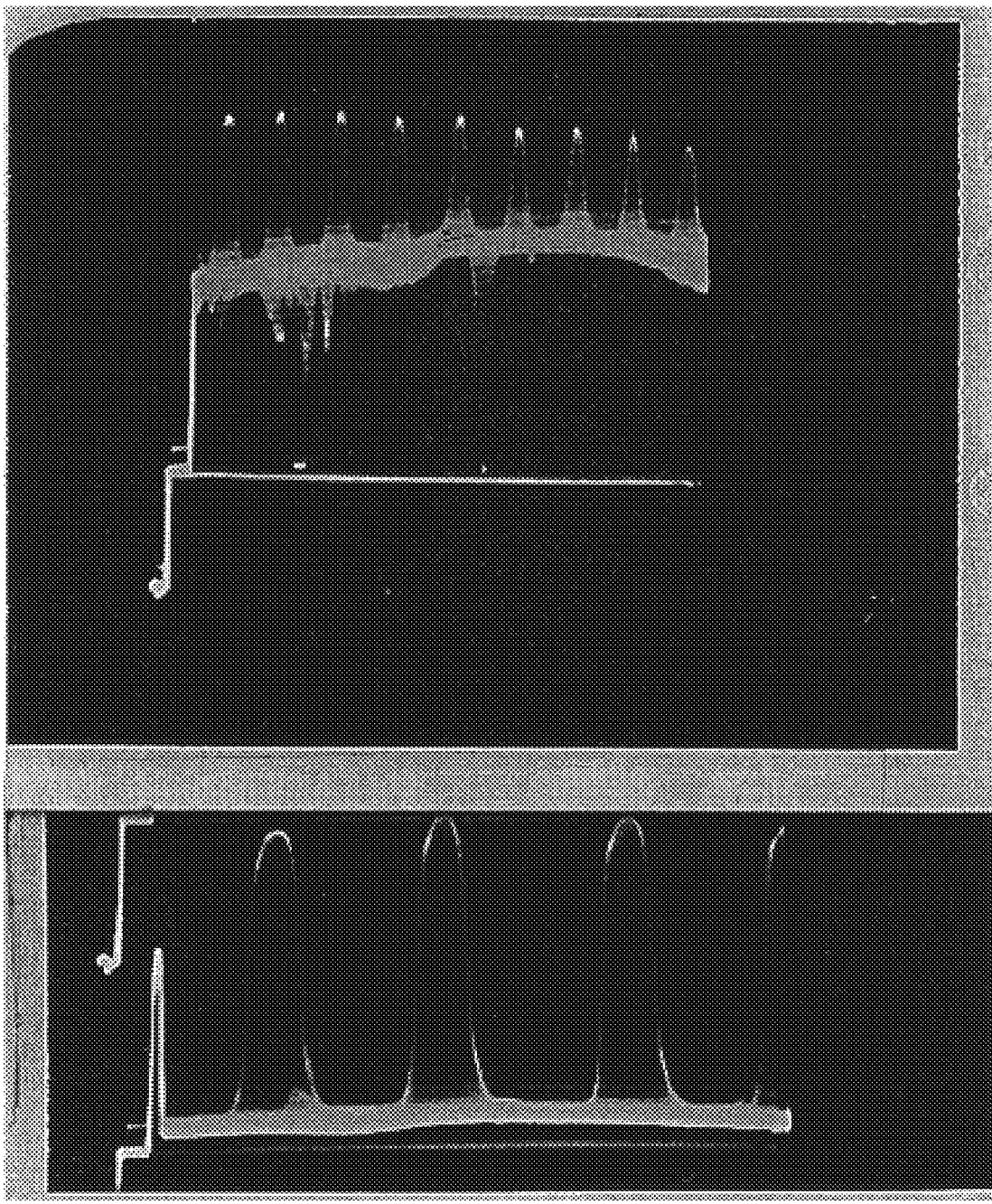
FIG. 12A illustrates the signal-to-noise ratio for information derived from a medium read by means of a conventional propagating illumination method using bright-field microscopy.
FIG. 12B illustrates the signal-to-noise ratio for information in a phase change medium read by means of near-field methods.

Also of importance to optical storage density is the contribution of the exponential vertical decay of the near-field. This exponential decay makes the contrast of the written optical artifacts extremely high, as the signal changes from total reflection of the illumination to almost total transmission with, in the case of actual optical artifacts, a depth change of only 0.2 microns. In the case of the phase change material, the contrast is also increased. The near-field illumination reduces surface or Fresnel reflection, and is strongly controlled by the absorption part of the complex refractive index of the phase change material. This causes the signal-to-noise, or contrast, of the optical artifacts to be greatly enhanced over viewing in normal illumination. FIG. 12B illustrates the increase in signal-to-noise ratio for information in a phase change medium read by means of near-field methods as compared to a conventional propagating illumination method using bright-field microscopy shown in FIG. 12A.

Description of the Preferred Embodiments

Figure 13:
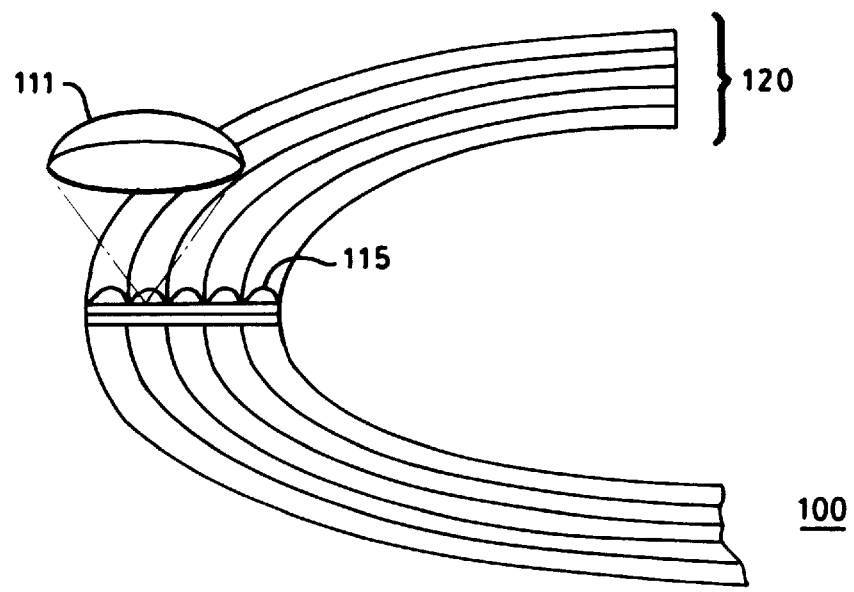
FIG. 13 is a diagrammatic perspective view of the optical reader of FIG. 7.
Figure 14:
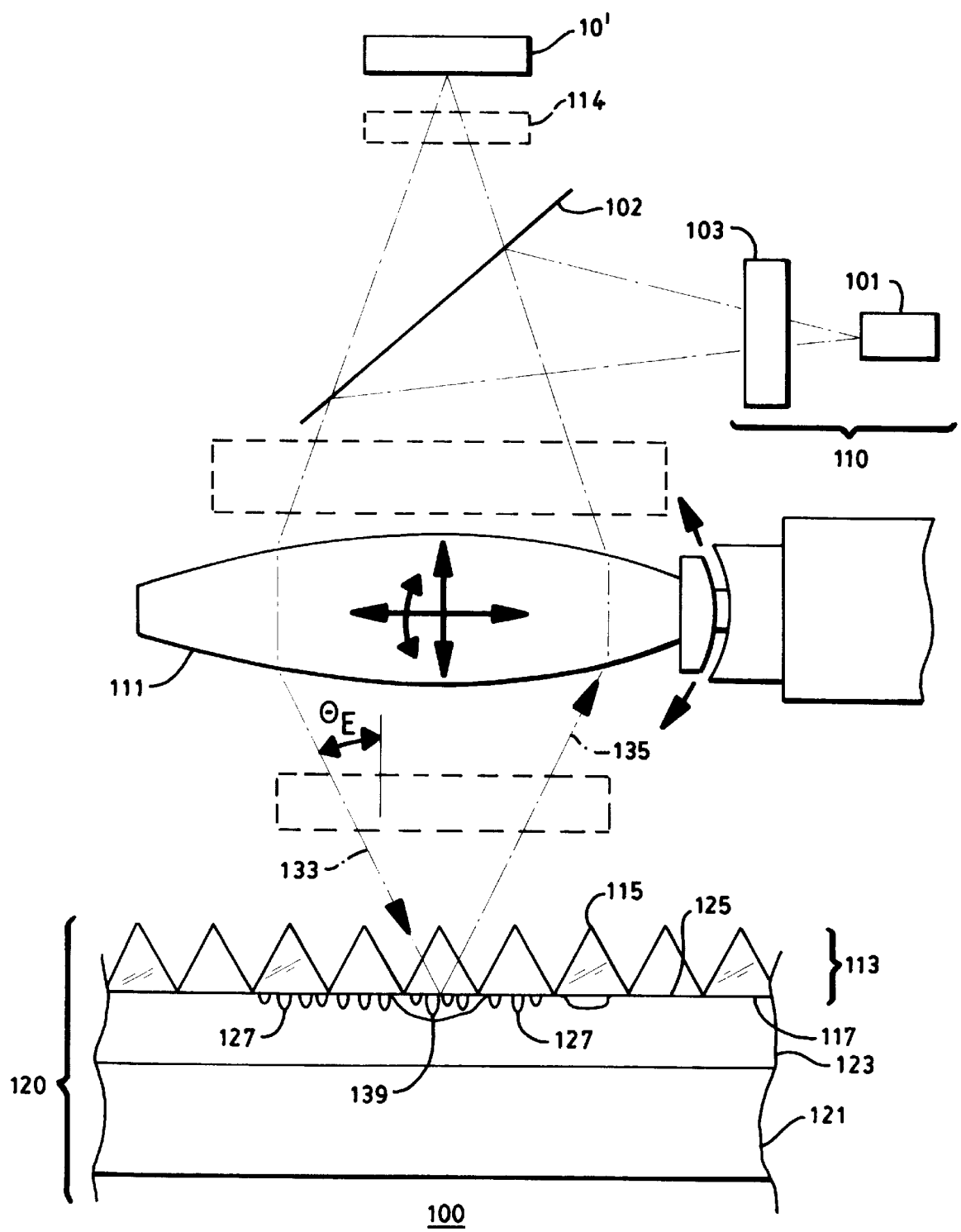
FIG. 14 is a diagrammatic view of an optical storage system comprising a source of illumination, an objective lens, and a storage medium in accordance with the present invention.

There is shown in FIGS. 13 and 14 a generalized diagrammatical view of an optical storage system 100 comprising an objective lens 111, an epi illumination section 110, and a storage medium 120 in accordance with the present invention. Objective lens 111 may be the objective of an optical disc drive or other similar device, such as the objective of a microscope. Storage medium 120, which may be flexible or rigid, comprises an optical layer 113 overlying an active layer 123 and may comprise a substrate 121, such as polycarbonate disc or card, or a mylar-based tape, to provide physical support to active layer 123. Optical layer 113 comprises a reflection surface 117, disposed on or adjacent to a data surface 125 of active layer 123, and a distributed structure of micro-optical elements 115, preferably configured as prismatic elements. Alternatively, active layer 113 and substrate 121 may comprise a single layer. It should be understood that storage medium 120 may include an enclosing housing or cartridge (described below) to provide protection for the enclosed medium proper and to facilitate loading into and removal from a storage drive device.

Active layer 123 may comprise a "write once" material, a read only material, or a material in which the written data can be "erased" (i.e., a rewriteable material). For example, active layer 113 may comprise any of the optically-active materials used in conventional optical storage media, such as magneto-optical (MO), phase change materials, and laser ablation surfaces (resulting in surface "pits" or "bumps"). As can be appreciated by one skilled in the relevant art, additional optically-active materials that would benefit from integration with micro-optical elements, in accordance with the present invention, include: photoresist, photorefractive polymers or crystals, photopolymers, chalcogenide glasses and compounds, photographic silver halide or other emulsions, fluorescently active materials, and semiconductor structures such as CCD or CMOS silicon detectors. Examples of photo-refractive materials include $LiNbO_3$ and $BaTiO_3$. Example of a phase change material is an alloy such as $Te_xSb_yGe_z$ or $Te_xSb_yGe_2Se_w$ (which is erasable).

The optical layer is, in one embodiment, the distributed structure of micro-optical elements 155, which may comprise an array of lenticular lenses (i.e., lenses having facets curved in one meridian), prism-like optics, or holographic optical elements, for example, or an array of micro-lenses (i.e., lenses having facets curved in at least two meridians), or one or more planar optical layers used in conjunction with said elements or, for example, an external aplanat, as described in greater detail below.

A data bit, represented by the presence or absence of one or more optical artifacts 127, is written to or read from data surface 125 by means of radiant energy transmitted into optical layer 113. This radiant energy produces an evanescent field 139 which is used to either read from data surface 125 or, when increased to an appropriate intensity or duration, to write to data surface 125. Reading and writing are performed as storage medium 120 is moved with respect to objective lens 111 and illumination section 110. Optical artifacts 127 comprise a local portion with change in polarization (Kerr rotation), optical phase, index of refraction, absorption, scatter, diffraction angle, critical angle, reflection, material phase state (e.g., crystalline to amorphous), or topography, in comparison to surrounding material.

Illumination section 110 comprises a radiation source 101 and is typically transmitted by means of a beam splitter 102. Epi illumination beam 133 is incident upon one or more micro-optical element 115 at an angle of incidence $\Theta_E$ with respect to the optical axis of optical layer 113. For angles of incidence $\Theta_E$ greater than the critical angle $\Theta_C$ of optical layer 113, there will be produced evanescent field 139 adjacent reflection surface 117 and local to micro-optical element 115, at least a portion of which field will lie within active layer 123. Evanescent field 139 provides the means by which optical artifacts 127 are detected (i.e., read) or produced (i.e., written). That is, the presence of optical artifact 127 will produce a detectable attenuation or frustration of evanescent field 139 as evanescent field 139 passes over optical artifact 127, and may result in the conversion of evanescent field 139 into propagating radiation 135 as described in greater detail below. Accordingly, the detection of optical artifacts 127 is preferably accomplished by means of one or more detectors 104, which may comprise, for example, a detector array or one or more charge-coupled devices (CCDs), which sense propagating radiation 135 passing through beam splitter 102.

Radiation source 101 is preferably of narrow bandwidth and may, for example, comprise a light-emitting diode such as a blue LED, a laser, a laser diode, or a broadband source of radiation optically coupled to one or more narrow band-pass filters or a monochromator, so as to limit the transmitted wavelengths to predetermined ranges. A coherent light source, such as a laser, produces an output with side lobes which is not desirable for use in reading because of cross-talk with adjacent tracks. The preferred source for reading is an incoherent source because it allows the full theoretical resolution of the optics and provides for whole-field imaging. Typically, an illumination source for the process of reading will comprise an LED because of the relatively low power level required. For the process of writing, a laser source is generally used because of a higher level of power required. Because the present system has whole-field capability, it becomes possible to use a plurality of laser sources to write multiple tracks concurrently. Where there is an erasable (i.e., rewritable) storage medium used, the process of erasing is accomplished by modulating both the intensity and duration of the illumination incident upon the active layer.

Figure 15:
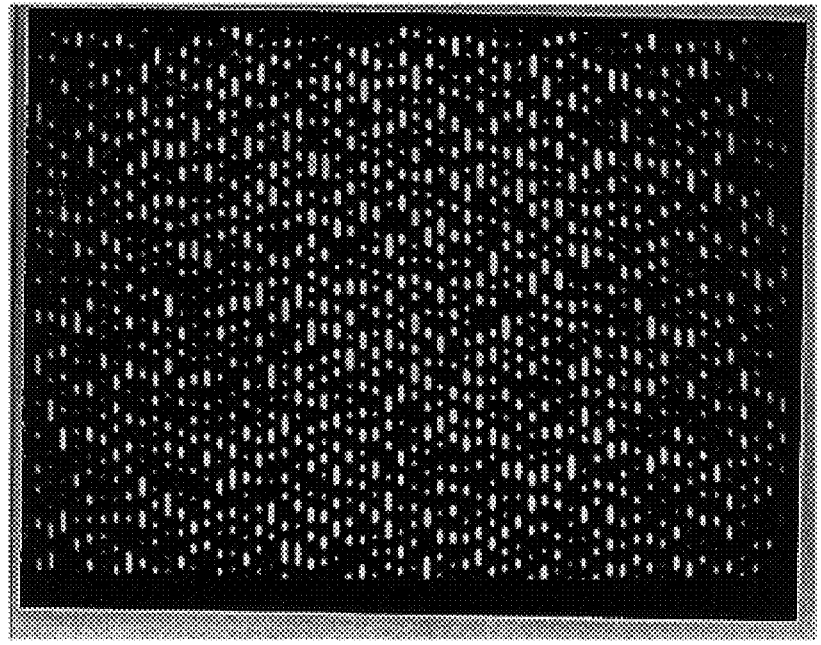
FIG. 15 a photomicrograph of a portion of an audio compact disc illustrating a plurality of encoded tracks as seen in near-field illumination.

Incoherent illumination may be provided by low-cost LEDs, such as currently available high-resolution blue LEDs. The incoherence reduces the ringing of coherent sources that is the cause of cross-talk between data tracks. Cross-talk prevents propagating coherent systems from using the full theoretical resolution derived from considering the NA and wavelength alone, so that, for example, the new DVD format, with coherent laser diode illumination, has a track pitch of 0.74 microns while at the wavelength and NA of the format, a track pitch of 0.4 microns would be possible with incoherent light. Is can be appreciated by one skilled in the relevant art that, while incoherent light results in the highest spatial resolution, incoherent light can be used in near-field optics and cannot be used in interference-based optical systems. Similarly, coherent light makes imaging multiple tracks and large fields difficult to achieve, while the incoherent light used in near-field allows whole-field multi-track imaging. FIG. 15 is a photomicrograph of a portion of an audio compact disc illustrating a plurality of encoded tracks as seen in near-field illumination.

Illumination section 110 may further comprise a phase controller 103 for controlling the phase of direct illumination beam 133 as it impinges upon optical layer 113. As described in greater detail below, phase controller 103 and its functions may be provided by a number of different means and preferably operates in response to external electronic circuitry (not shown). Accordingly, when phase controller 103 is used in optical storage system 100, detector 104 comprises a phase analyzer.

Figure 16:
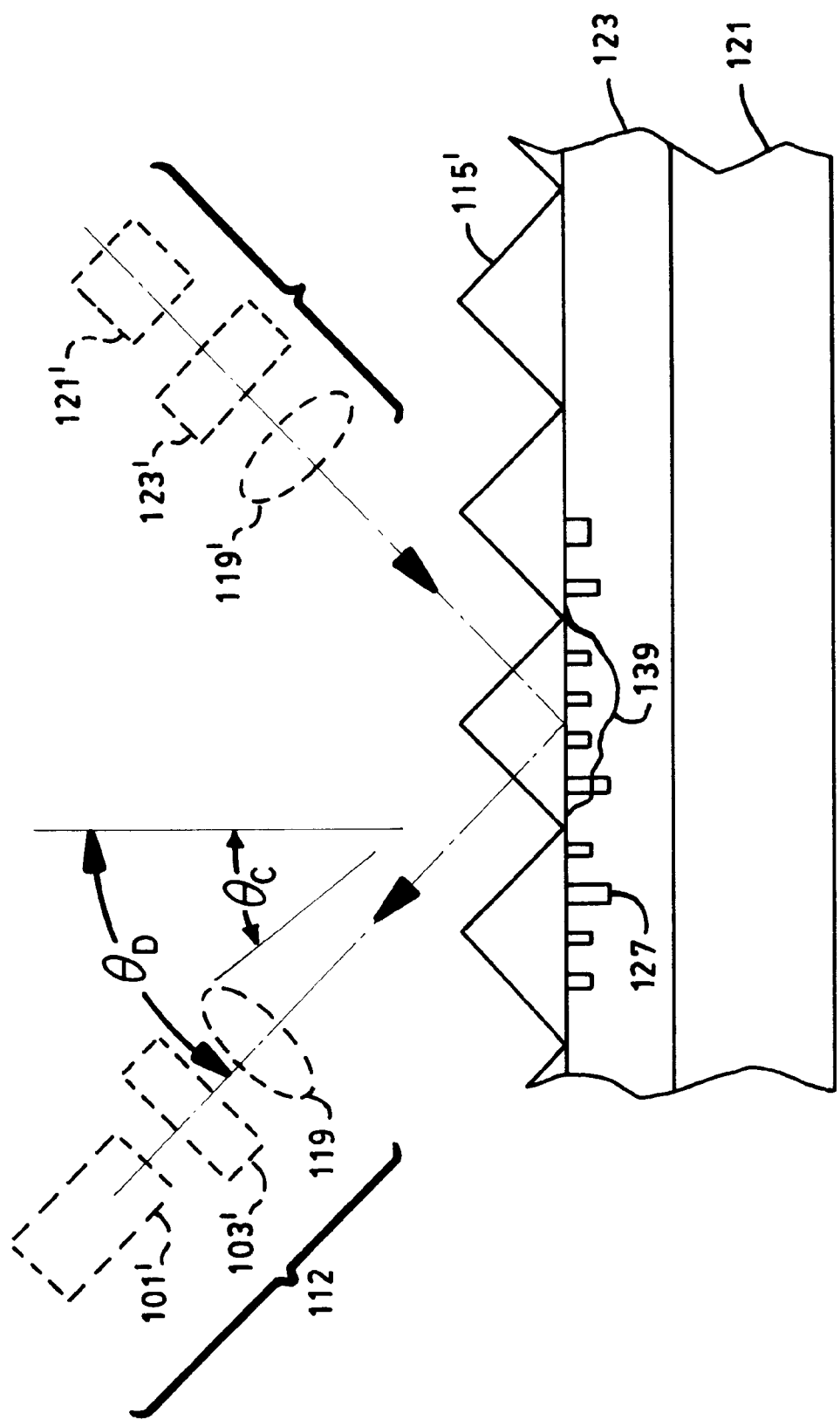
FIG. 16 is a diagrammatic view of an alternative embodiment of the optical storage system of FIG. 14 comprising a dark-field source of illumination.

Oblique Illumination and Imaging:

In a preferred embodiment, best seen in FIG. 16, illumination section 110 is not used. Rather, read/write illumination is provided by means of an illumination section 112. Illumination section 112 comprises a radiation source 101', a focusing lens 119 for providing an illumination beam 134 oblique to optical layer 113 and, optionally, a phase controller 103'. There is also shown an oblique objective 119', an optional phase controller 123', and detector 121' when used with illumination section 112.

In this embodiment, the illumination is again reflected light from above, as in the epi illumination, but the illumination and imaging axes are not coaxial and are equally oblique to the optical normal axis, and, unlike the tilting objective in the propagating case where the integral optical layer is a lenticular aplanatic cross section, the obliquity here is fixed. The entire base of the prism is seen at once, and the tilt and defocus introduced are very small according to the small size of the integral optical element. If the oblique objective is actuated radially, then all defocus is removed as it traverses the integral optical element. While the actual NA of the objective is considerably less than one, the oblique incidence and viewing angle provide for an effective numerical aperture of considerably greater than one, because the NA is defined and measured at the sample plane, in this case the base of the integral optical element. If the oblique head (where the head comprises both the imaging/detection objective lens as well as the opposed illumination source) is incident at less than the critical angle, the illumination is propagating and can be used in the normal fashion, such as interference, for example. If the incidence is at greater than the critical angle, the illumination is evanescent with all the attributes discussed brought to bear. At each of the extremes of the prism base, one or the other of the first order diffraction is occulted by the prism itself or by a neighboring prism, but the remaining first order is sufficient to form an image with the zero order. For this arrangement, the cone subtended by the objective need not match the angle subtended by the prisms. For example, the integral prism elements may be 45°-90°-45° prisms, with the objective being NA 0.65.

Dihedral Reflector Elements

Figure 17:
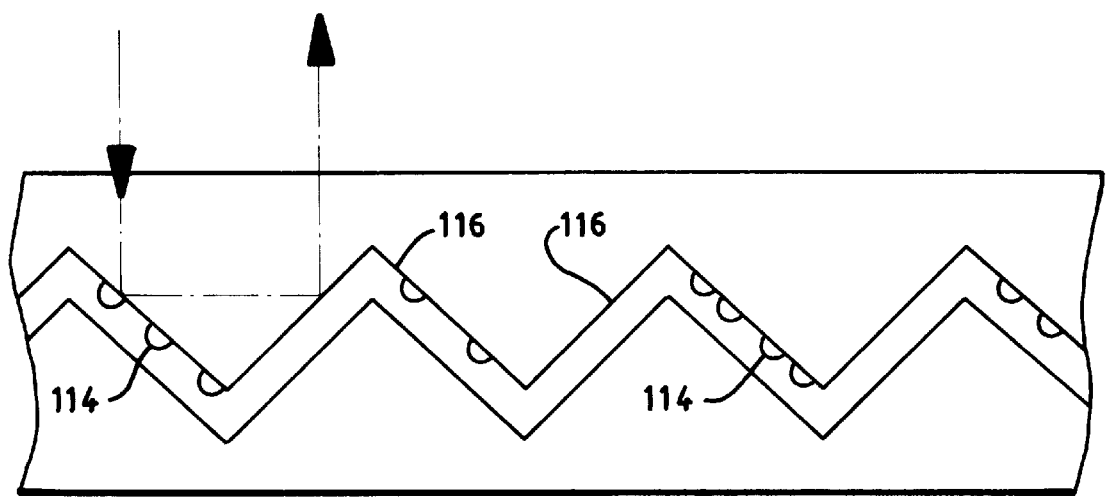
FIG. 17 is a diagrammatic cross-sectional view of a storage medium, in accordance with the present invention, wherein the integral optical layer comprises dihedral reflector elements.

In yet another embodiment, shown in FIG. 17, the integral optical layer comprises dihedral reflector elements 116, wherein incident and exiting light from the reflector elements undergoes at least two internal reflections from the surfaces forming the dihedral angle, one or both of which reflections may be a total internal reflection. The active layer is coated onto the external faces of the dihedral reflector elements, with optional intervening layers disposed for resonance or other purposes as discussed earlier. The external head is incident normal (perpendicular) to the plane of the medium. Data 114 is stored on, preferably, only one of the internally reflecting surfaces. The optical artifact either restores total internal reflection in an otherwise frustrated TIR field, or frustrated total internal reflection in an otherwise totally reflecting field, or is simply a propagating light effect. The advantage in this embodiment is that it eliminates the need for planarizing the internal integral micro-optics with a high-index material as before, while providing the same internalizing and protection of both the optics and the data associated with the active layer. While one of the surface pairs is sacrificed for reflection of the data, the data surface area is increased by a factor of the square root of 2, for only a small total reduction of data surface area. With polarization differentiation, data may be stored on both of the internal reflection surfaces.

Fabrication of Optical Layer

Figure 18:
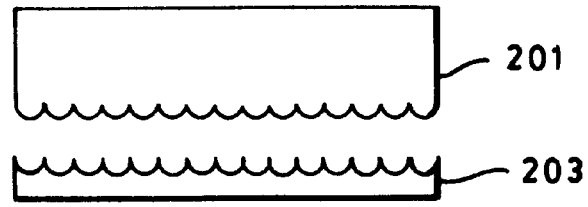
Figure 19:
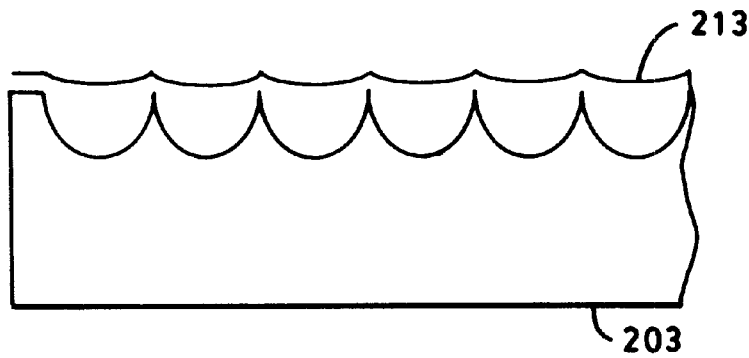
Figure 20A:
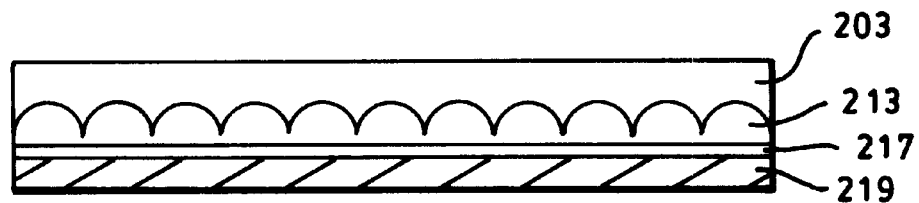

The masters for the micro-optic arrays can be fabricated by any one of a number of well-known techniques, including precision computer-controlled diamond turning, photolithography, multiple-beam laser lithography, laser mastering lathe, or e-beam lithography. As shown in FIGS. 18, 19, and 20A, a master 201 is fabricated from which an inverse master 203 is formed. Master 201 can be replicated either directly or in a material such as electro-less nickel, for example, to form inverse master 203. Inverse master 203 would be used in a fabrication process such as compression, injection, or sequential injection/compression molding of any of a number of plastics such as polycarbonate, acrylic, and others. Alternatively, inverse master 203 can be used for embossing micro-optics into a polymer web.

Figure 20B:
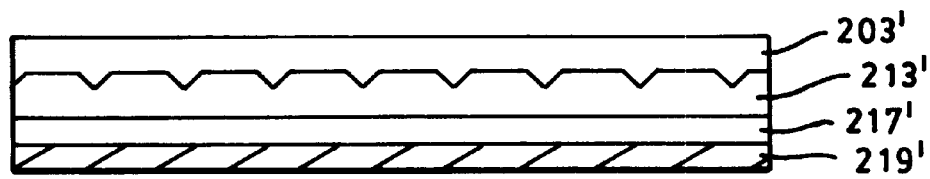

In fabricating master 201, a servo structure (not shown) can be formed to produce a corresponding servo pattern 211 in inverse master 203 to be replicated onto a micro-optical structure 213. In this manner, there is assured accurate registration between servo pattern 211, which is used for tracking in the reading and writing operations, and micro-optical structure 213. Alternatively, servo pattern 211 can be embossed, stamped, or otherwise formed into micro-optical structure 213 in a secondary operation in which registration is achieved by known optical alignment methods, including Moire interferometry. Following the formation of micro-optical structure 213, there can be added an active layer such as a phase change layer 217 and a protective layer 219, for example, as well as an optional resonant structure layers or a low-index FTIR layer. In an alternative embodiment, shown in FIG. 20B, a micro-optical structure 213' comprises truncated prism-like elements.

Fabrication of Micro-Optics

Internal micro-optics that have been formed by embossing, stamping, molding, or otherwise must be filled with an optical material having an index of refraction sufficiently larger than the host substrate material to maintain the critical angle for TIR. So, for a host substrate of polycarbonate with an index of refraction of 1.5, the concave micro-optics may be filled with a high index polymer of about 1.9 to 2.1 (see Gaudiana '430). This may be done in a two-shot molding operation, or the high index polymer may be spin-coated onto the substrate. Other alternatives include depositing $ZrO_2$, ZnS, or other high-index material into the micro-cavities by magnetron sputtering or other vacuum deposition technique, followed by a planarizing operation as is known in the microelectronics industry. Here, the small amount of material deposited requires the micro-cavities to be very small, on the order of a micron in pitch. Many high-index materials may be applied with a sol-gel technique, although the host substrate will have to be of a plastic that can withstand the required solvents and high temperatures. For specialized non-rotational applications, the internal micro-optics structure may be formed from a preform drawn down to the required dimensions.

The optimum size of the micro-optic is determined by mastering, manufacturing, and optical design considerations. Mastering techniques now available suggest a pitch size of not too much below 3 to 5 microns, while embossing techniques become problematic with sizes greater than about 50 microns. Optical aberrations in the prismatic approximation of the aplanatic sphere are minimized as the optic becomes smaller, while the number of data tracks per optic is optimized for the larger optic sizes.

Storage Medium with Integral Optical Layer

Figure 21:
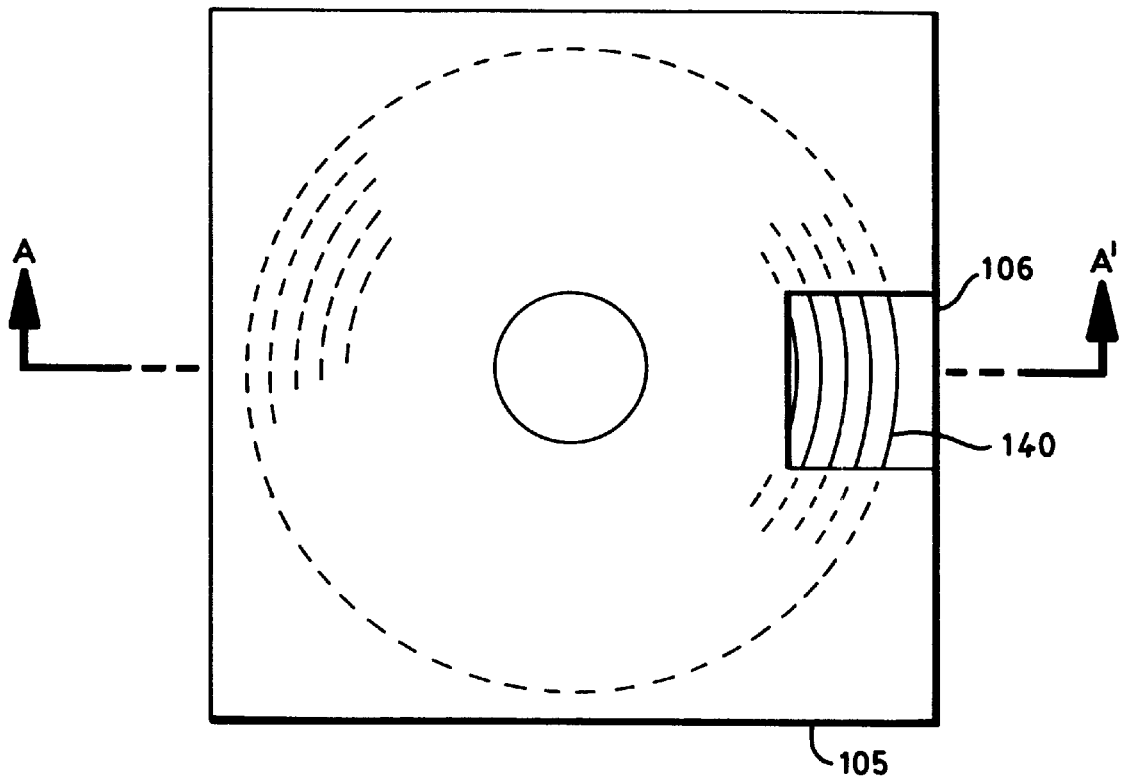
FIG. 21 is a first embodiment of a storage medium in accordance with the present invention disposed within a protective housing.
Figure 22:
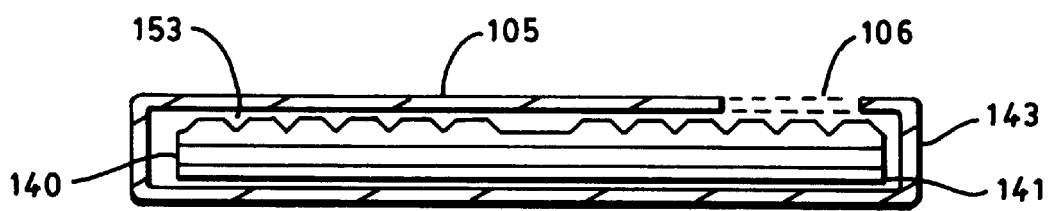
FIG. 22 is a cross-sectional view of the optical storage medium and housing of FIG. 5, taken through section A—A'.
Figure 23A:
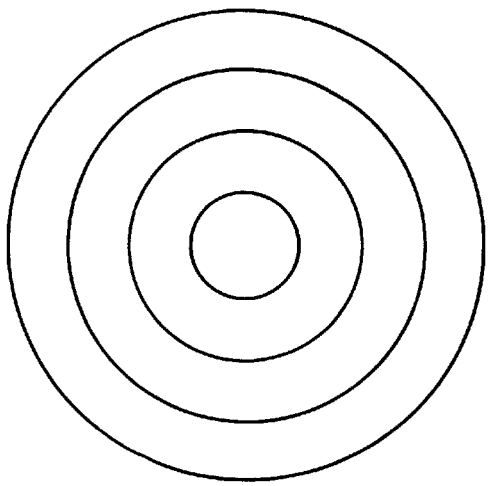
FIGS. 23A and 23B illustrate concentric and spiral configurations of data storage on a circular disc.
Figure 23B:
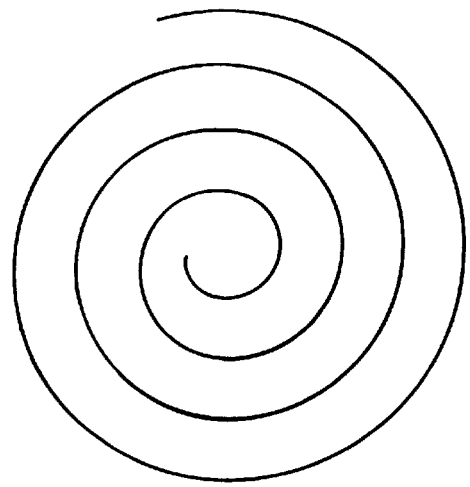
Figure 24A:
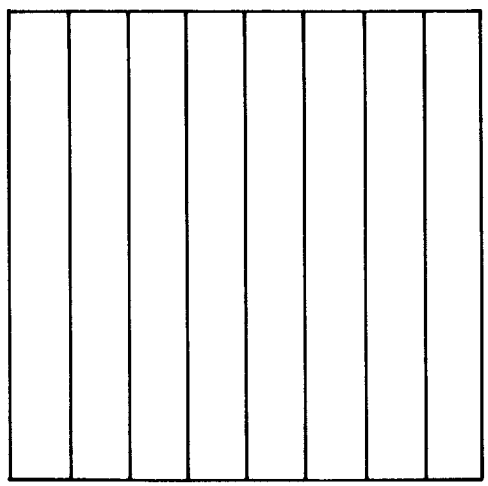
FIGS. 24A and 24B illustrate rectilinear and rotational configurations of data storage on a rectangular medium.
Figure 24B:
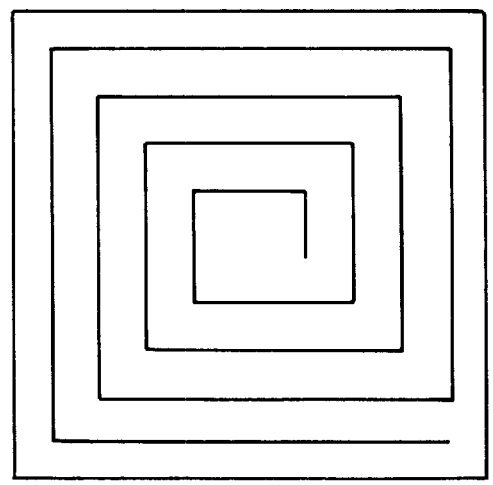

In a first embodiment, as best seen in FIGS. 21 and 22, data is written to or read from a storage medium 140 comprising an optical layer 153 integral with an active layer 143 preferably disposed upon a substrate 141. In the configuration shown, storage medium 140 is disc-shaped, and optical layer 153 comprises a plurality of concentric or spiral lenticular lenses (see for example, FIG. 23) wherein storage medium 140 is rotated for the reading and writing of data. In an alternative embodiment (see FIG. 24), storage medium 140 may be rectangular in shape with data retrieval and storage accomplished by means of rotation or rectilinear motion, for example. Alternatively, storage medium 140 can be stationary with data retrieval accomplished by means of a whole-field imaging detector array. Storage medium 140 may be disposed within an optional protective housing 105, as shown. Housing 105, which serves to minimize the possible contamination of active layer 143, comprises an optically-transparent window 106 to provide for access for the writing of data to and the reading of data from active layer 143.

Figure 25:
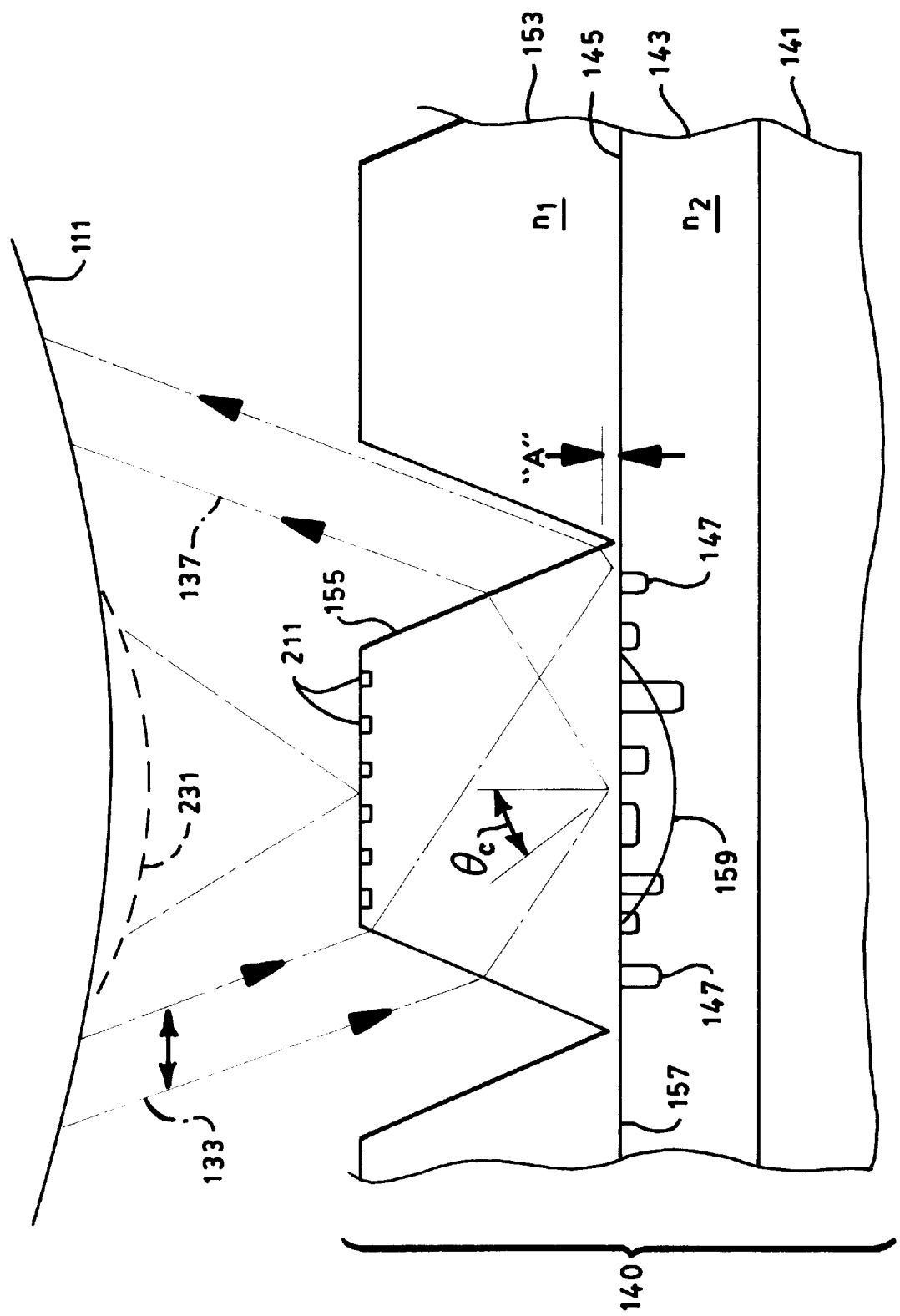
FIG. 25 is a diagrammatic cross-sectional view of the storage medium of FIG. 4 showing a layer of optical material disposed upon an active, data-storage layer.

As best seen in FIG. 25, active layer 143 comprises a material having an optical property that change state to produce an optical artifact 147 within a data surface 145 upon exposure to a sufficient intensity and duration of direct illumination beam 133. In the preferred mode, direct illumination beam 133 is incident on a reflection surface 157 at an angle of incidence greater than critical angle $\Theta_C$ of a truncated prismatic micro-optical element 155 such that there is generated an evanescent field 159, at reflection surface 157 proximate illuminated micro-optical element 155, extending into active layer 143. It should be understood that there may be more than one optical artifact 147 in data surface 145 lying beneath one micro-optical element 155, and that reading or writing of data would be performed as objective lens 111 and illumination beam 133 are translated relative to optical layer 153.

The index of refraction $n_1$ of optical layer 153 is preferably greater than either the index of refraction $n_2$ of active layer 143 or the index of refraction $n_3$ of optical artifact 147. The change in state of optical property resulting in the production of optical artifact 147 can be a change in index of refraction (e.g., from $n_2$ to $n_3$). Alternatively, there may be a change of state in polarization, in phase, in scatter, or in topography. These changes in optical property may be produced by the application of direct illumination beam 133 contemporaneously with the application of an external magnetic field (not shown). The process of reading, or detection, makes use of the fact that, in the absence of optical artifact 147, direct illumination beam 133 is emitted from micro-optical element 155 as reflected radiation 137, and where optical artifact 147 is present, there is produced an attenuation of total internal reflection and propagating radiation 135 is emitted to objective lens 111. In an alternative embodiment, objective lens 111 may comprise a bifocal feature 231.

In an alternative mode, the illumination source comprises a direct illumination beam 133' incident at an angle less than critical angle $\Theta_C$. In this alternative mode, evanescent field 159 is not produced, but the resulting resolution is still greater than that of a conventional optical storage system.

Storage Medium with Optical Window

Figure 26A:
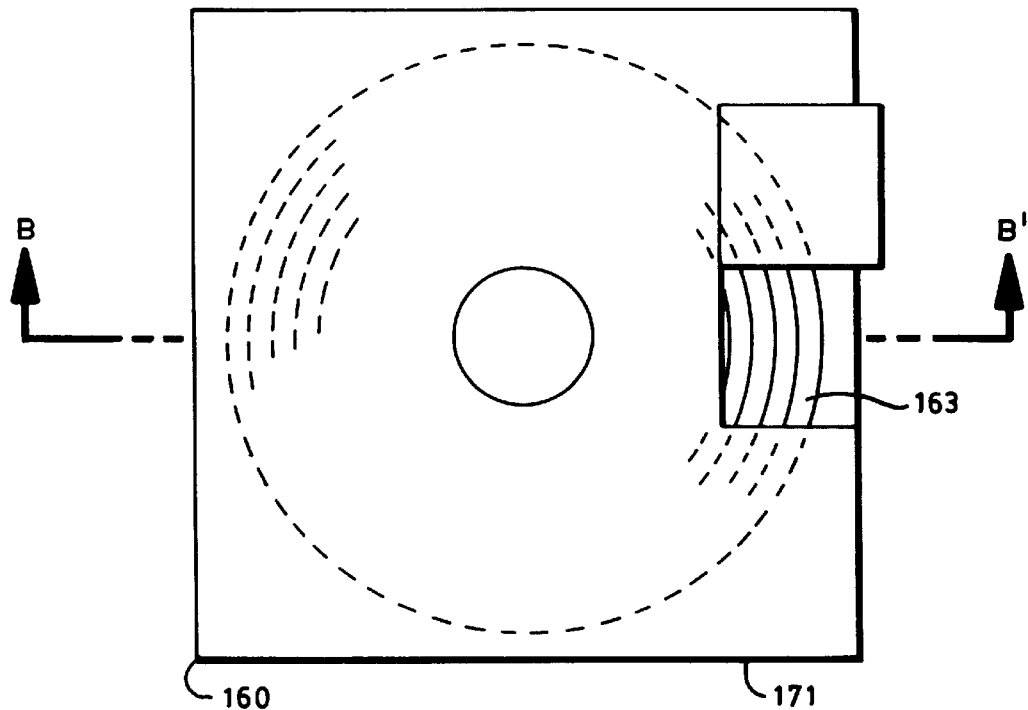
FIG. 26A is a second embodiment of a storage medium in accordance with the present invention comprising a protective housing and an optical window.
Figure 26B:
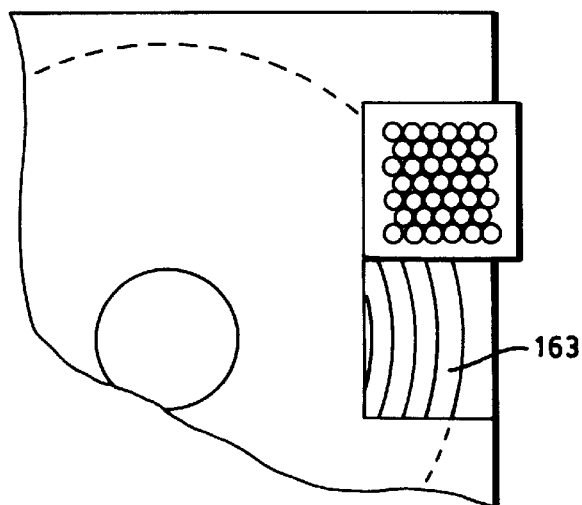
FIG. 26B is an alternative embodiment of the storage medium of FIG. 26A.
Figure 27:
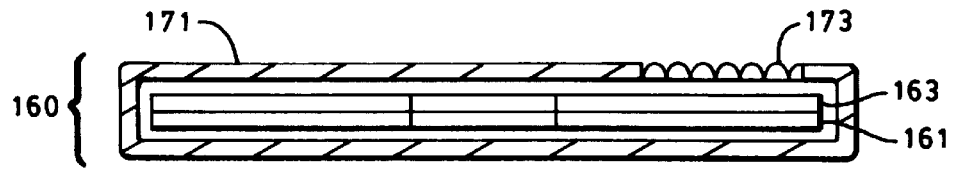
FIG. 27 is a cross-sectional view of the storage medium of FIG. 7, taken through section B—B'.
Figure 28A:
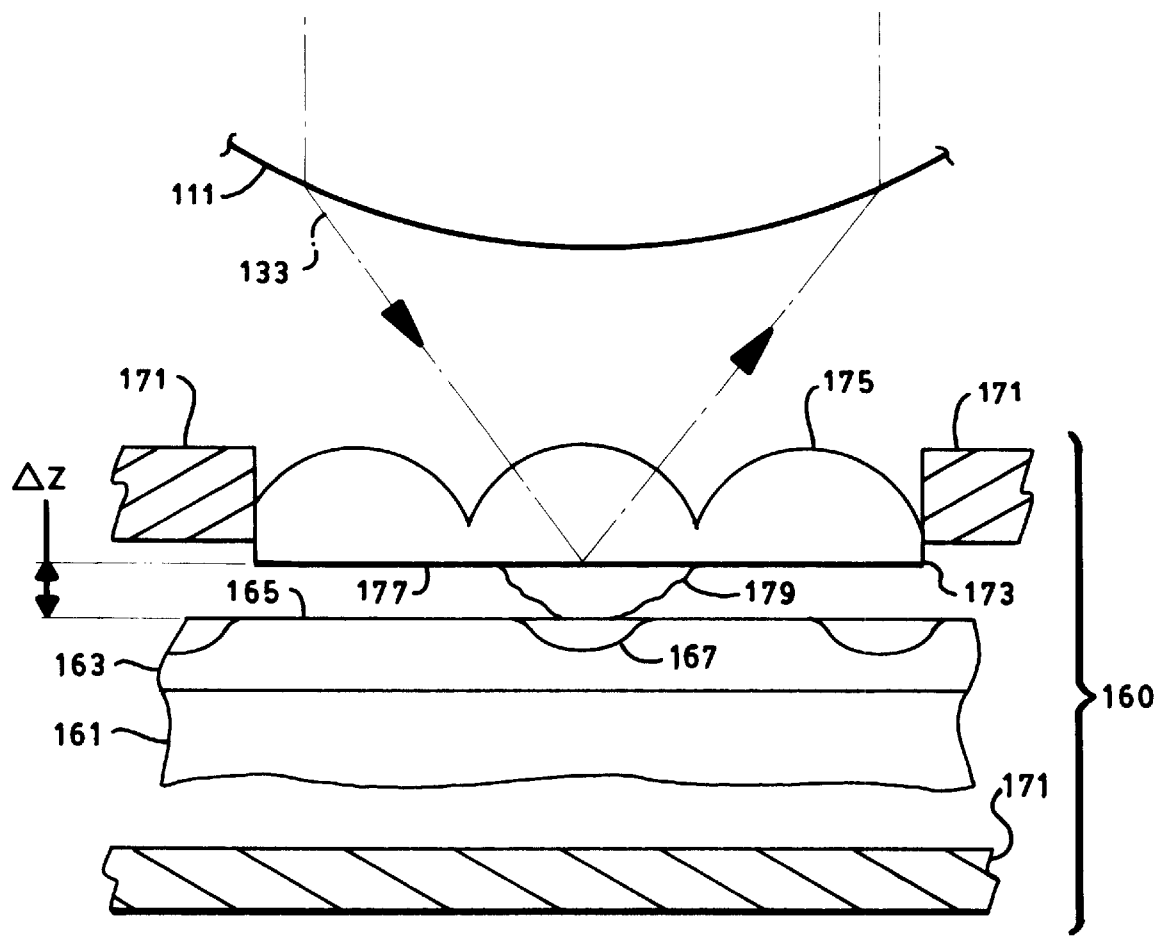
FIG. 28A is diagrammatic cross-sectional view of the storage medium of FIG. 26B showing a layer of optical material spaced apart from an active, data-storage layer.

In a second embodiment, as best seen in FIGS. 26 and 27, data is written to or read from a storage medium 160 comprising a housing 171, an optical-layer window 173, and an active layer 163 preferably disposed upon a substrate 161. As best seen in FIG. 28A, a data bit is represented by the presence or absence of one or more optical artifacts 167 detected within a data surface 165. Active layer 163 and substrate 161 are disposed within housing 171. Optical-layer window 173 comprises a distributed structure of micro-optical elements 175, such as an array of lenticular lenses (as shown) or alternatively, an array of micro-lenses. During the process of detecting or producing optical artifacts 167, active layer 163 is translated relative to objective lens 111, as indicated by arrow 19, and data is written to or read from active layer 163 through optical-layer window 173.

During the read/write processes, reflection surface 177 of optical-layer window 173 is retained at a substantially fixed distance Δz from data surface 165, preferably on the order of one wavelength of direct illumination beam 133. In the preferred mode, direct illumination beam 133 is totally internally reflected from reflection surface 177 at an angle of incidence greater than critical angle $\Theta_C$ of micro-optical element 175 such that there is produced evanescent field 179 at reflection surface 177 extending away from illuminated micro-optical element 175 and into active layer 163. In the configuration shown, evanescent field 179 is frustrated by the presence of optical artifact 167 encountered within active layer 163. The complex index of refraction (n+ik) of active layer 163 is greater than the index of refraction ($n_o$) of the material (typically air) present between reflection surface 177 and data surface 165.

Figure 28B:
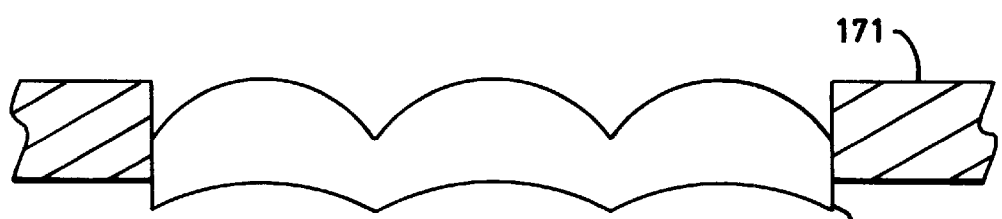
FIG. 28B is an alternative embodiment of the storage medium of FIG. 28A comprising convex facets.
Figure 28C:
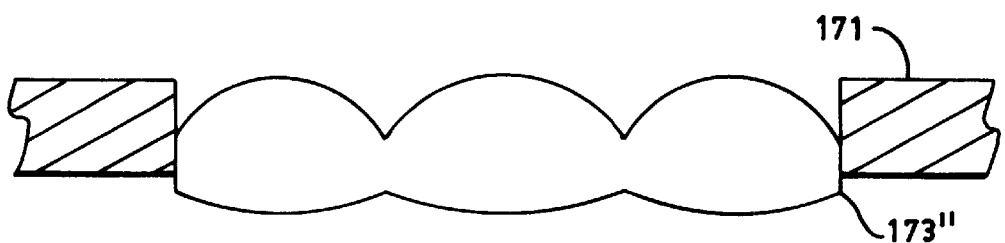
FIG. 28C is an alternative embodiment of the storage medium of FIG. 28A comprising concave facets.

In one alternative embodiment, shown in FIG. 28B, storage medium 160 comprises optical-layer window 173' comprising a distal surface with concave curvature (with respect to the medium) for optical correction. In another alternative embodiment, shown in FIG. 28C, storage medium 160 comprises optical-layer window 173" comprising a distal surface with convex curvature for facilitating proximal flying.

Propagating Case

While a medium with integral near-field optics is preferably used to realize the many attributes and applications, many, but not all of which have been described here, of the evanescent field component of the near-field, there are also benefits to be gained by using the integral near-field optics for only the propagating illumination component of the near-field. This is accomplished by i) illuminating the integral micro-optics with an incident angle no greater than the critical angle within the micro-optics, such that there is no total internal reflection within the micro-optics and hence no evanescent field, or ii) by changing the index of refraction of one or more of the following: micro-optic optical layer, active optical layer, intervening optical layers if present, such that there is no critical angle, or the critical angle is so large as to be outside of the illumination cone. In either of the former, all light is propagating and no evanescent fields exist.

If the integral micro-optics are integral to the medium proper, numerical apertures of greater than 1 can still be achieved as in the evanescent field case, but the other attributes of the evanescent field are absent. The optical operation in this case is simply that of an immersion microscope as invented by Abbe in the 1880's. Resolution, and therefore data storage density, is increased over that of the original objective in air by a factor of the ratio of the numerical apertures, for the lenticular micro-optics, and by that ratio squared when the micro-optics comprise full figures of rotation.

If the micro-optics are integral to the medium cartridge such that there is a layer of air between the optics and the medium proper, the numerical aperture can be no greater than 1 in this propagating light case. All light at greater numerical apertures would be totally internally reflected. Here the layer of air can be much greater in thickness than in the case of the evanescent field. Flying heights of many wavelengths become allowable, because the light is propagating. Each of the micro-optic elements in combination with the external objective or objective array comprise a conventional high numerical aperture "dry" objective, as they are known in microscopy. For best optical performance, the surface of the micro-optic elements facing the active optical layer may be concave, and all surfaces may have aspheric curvatures which are easily molded into, for example, plastic optics. As in the evanescent field case, the micro-optic elements are preferably full figures of rotation and are staggered in an array such that their fields of view overlap so that there are no areas of the active optical surface that are not imaged.

In both of these cases the advantage is an increase in optical data density, with a larger flying height in the latter and some reduction of noise from topographic roughness of the active optical layer, if present, in the former. However, the optical contrast and signal to noise enhancement contributed by the evanescent field illumination is absent. Contrast can be regained by reverting to, in the case of read-only-media, an interference detection method, requiring topographic pits coated with an aluminum layer, as is well known and practiced now. Other active optical layers, such as magneto-optical, phase change, or other, would exhibit the same degree of optical contrast as they do now in propagating light, which is to say less contrast than with evanescent field illumination but sufficient contrast to work. The micro-optics, by virtue of increasing the numerical aperture and reducing the writing spot size, also function as light intensifiers, which can be utilized in faster writing speeds or lower power laser diodes.

Propagating configuration of optics integrated with housing

In a configuration wherein the medium is illuminated by propagating illumination, each of the optical elements comprising the micro-optic array in the housing can have the required optical power and surface disposed on both sides of the optic. This configuration will allow the maximization of numerical aperture, resolution, and field-of-view while keeping optical aberrations to a minimum by methods generally well understood and known to one skilled in the relevant art.

Integrating a micro-optic array to the cartridge housing the new DVD medium, for example, would increase the numerical aperture from the existing 0.6 to about 0.95 for a substantial increase in areal density, and is backward compatible with the DVD system.

Integral Optical Layer as Interference Reference

The optical layer integral to the medium has been generally discussed herein is used, among other things, to increase the areal storage density whether the evanescent or propagating illumination is used. There is also an increase in optical contrast and signal to noise enjoyed in the former, while in the latter the optical contrast is much lower but sufficient. For ROM or other media where the optical artifacts are read by optical interference techniques, and propagating illumination is used, the integral optical layer may function as a contact or proximal interference reference plate, such that the interference is of the first order that is the black center in the colored Newton interference fringes, for example. While the vertical range is not as large as for the evanescent field case, the contrast is similar. This is sometimes known as contact interference microscopy, but has not been applied to optical data storage heretofore because of the absence of a proximal interference reference at the medium. In this way, even with propagating light the signal to noise ratio can be enhanced, while eliminating the need for a metallic reflecting layer in the medium and phase analysis optics in the drive.

In fact, while the first order interference provides the highest contrast with broadband and white light, additional vertical range and vertical data encoding can be obtained with this interference when the colored interference fringes are included. With the use of appropriate narrowband color filtration anywhere in the optical path, or alternately the use of plural light sources of different illumination wavelengths, data of only a specific wavelength may be passed to the exclusion of the others. Thus, information from multiple vertical layers, or even overlapping optical artifacts in the same layer, may be separated. The surface of the optical layer facing the drive may, as before, be prismatic, lenticular, or planar, and may be used in combination with an optical lens array, a single lens, or a flying optical head.

Near-field form of optics integrated with cartridge

For the near-field illumination, the side of the micro-optic array integral to the cartridge and facing the medium can be planar, but preferably will have slight convex curvature in order to optimize the low-flying characteristics required by the exponential decay of the near-field.

Flying heights for the micro-optic array integral to the cartridge.

Near-field requires flying heights of typically 0.1 microns for high coupling strength. That the intensity is increased by the constructive interference in the parent wave allows some tolerance here, in that even a higher flying height will still result in adequate signal.

For the propagating illumination, flying height can be several orders of magnitude greater than for the near-field.

The micro-optic array integral to the cartridge can be on the surface of the window and protected by a moveable shutter, or can be internal to the window and filled and substantially planarized with a high-index optical material (see Gaudiana polymer patent).

Optical Window Configuration

Figure 29A:
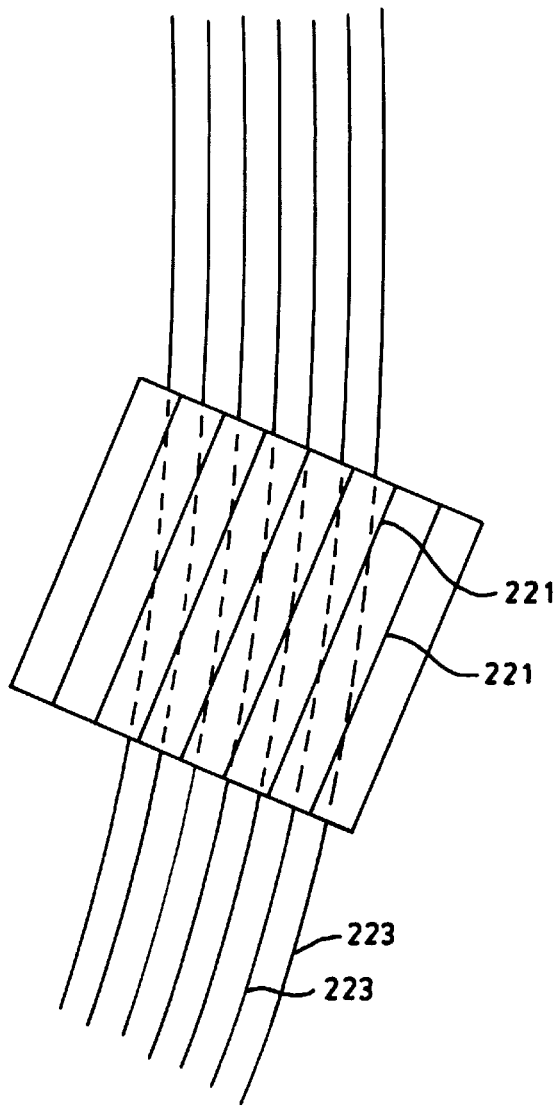
FIG. 29A is an alternative embodiment of the storage medium of FIG. 26A comprising lenticular lenses disposed at an acute angle to the medium data tracks.
Figure 29B:
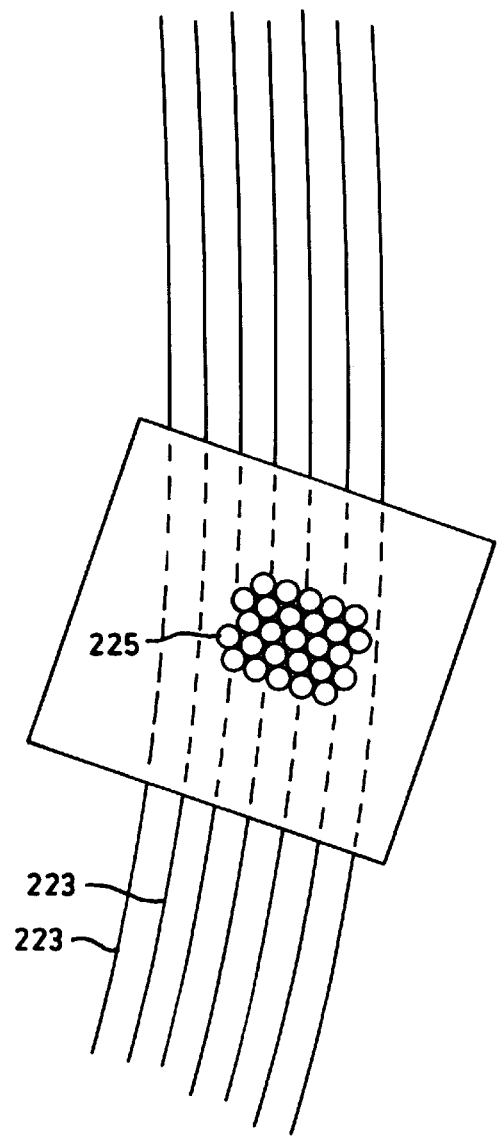
FIG. 29B is an alternative embodiment of the storage medium of FIG. 26B comprising a micro-optical array disposed at an acute angle to the medium data tracks.

FIG. 29A illustrates a window configuration wherein lenticular lenses 221 are oriented at an acute angle to data tracks 223, and FIG. 29B illustrates a window comprising an array of micro-optical lenses 225 oriented at an acute angle relative to adjacent data tracks 223.

Storage Medium with "Split" Optics

Figure 30:
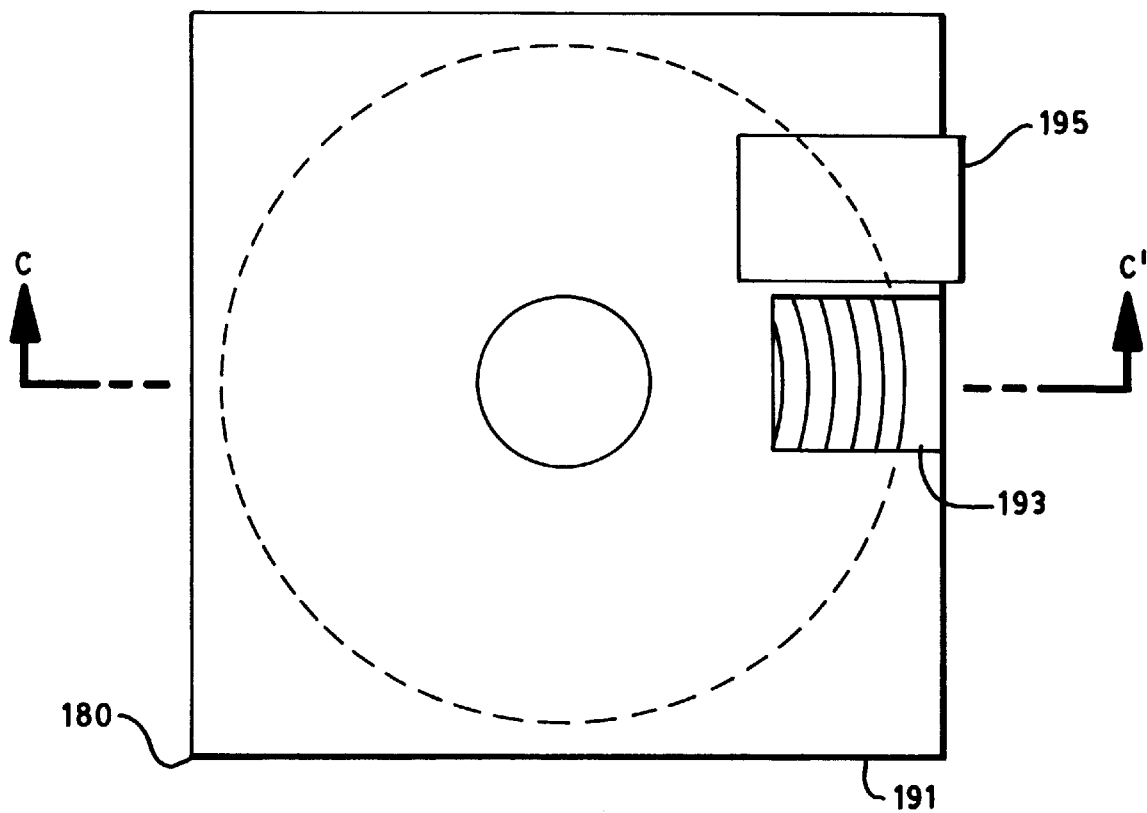
FIG. 30 is a third embodiment of a storage medium in accordance with the present invention comprising a layer of optical material disposed upon an active, data-storage layer, a protective housing, and a slideable cover retained over an opening in the housing.
Figure 31:
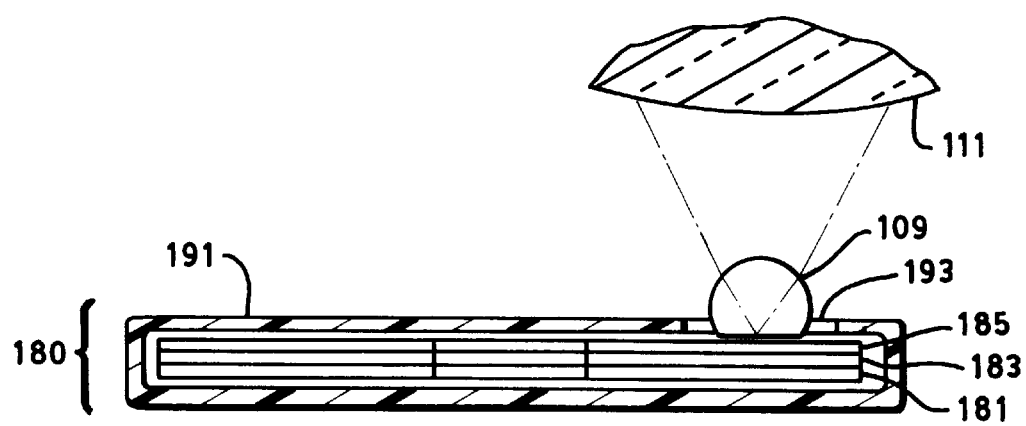
FIG. 31 is a cross-sectional view of the storage medium of FIG. 30, taken through section C—C' and in use with external writing/reading optics.
Figure 32:
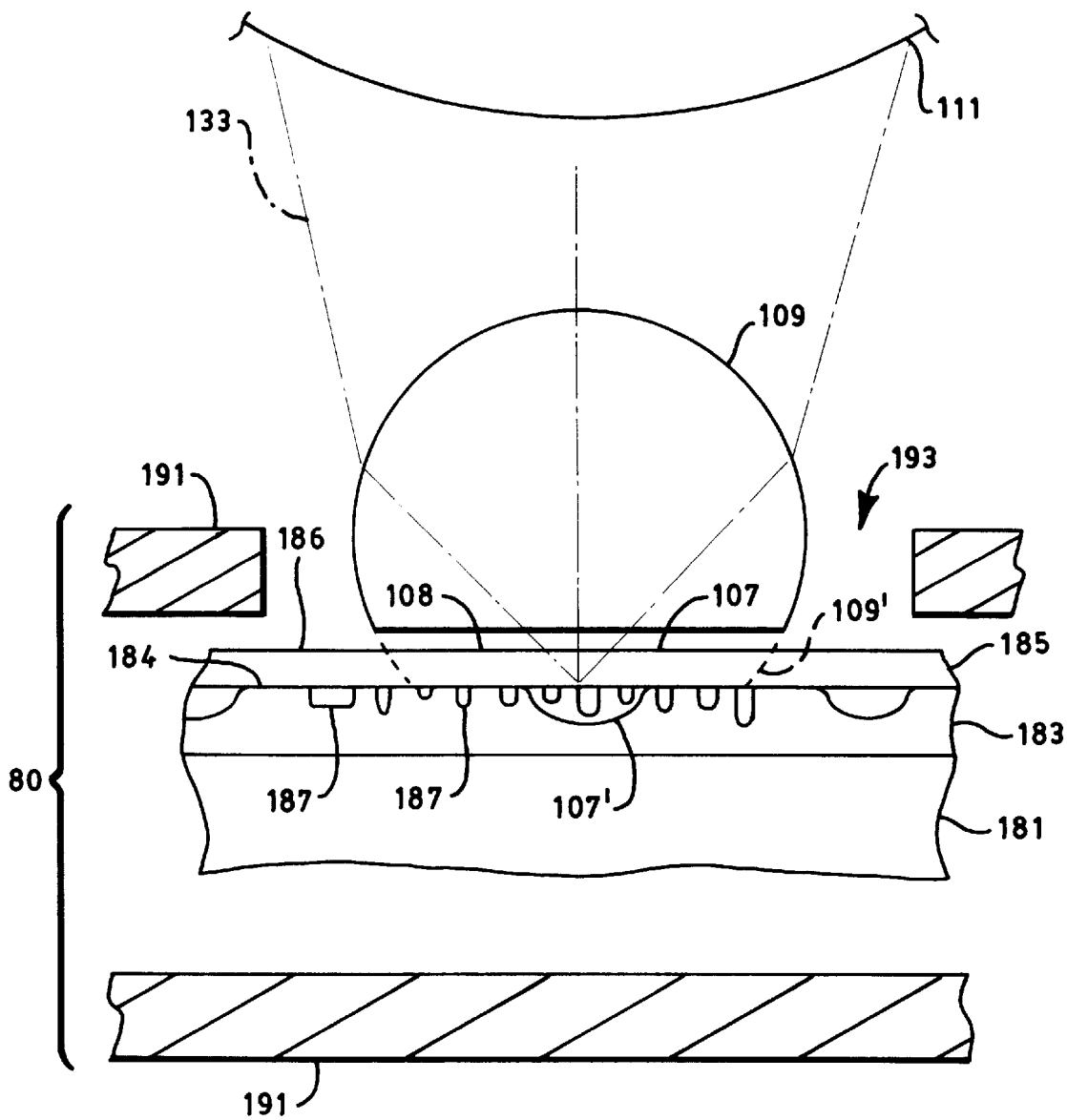
FIG. 32 is diagrammatic cross-sectional view of the storage medium of FIG. 31 showing a layer of optical material spaced disposed upon an active, data-storage layer and optically coupled to an external flying split aplanat.

In this embodiment, as best seen in FIGS. 30 and 31, there is shown a storage medium 180 comprising a housing 191, an aplanat layer 185, and an active layer 183, which is preferably disposed upon a substrate 181. An opening 193 is provided in housing 191 to allow access to active layer 183. Storage medium 180 may further comprise a sliding cover 195 (shown in FIG. 30 only, for clarity) as a means of minimizing the entry of contaminants into housing 191. Data is written to or read from storage medium 180 by means of a flying split aplanat 109 disposed between active layer 183 and objective lens 111 in a configuration best explained with reference to FIG. 32.

Reading and writing of data is accomplished by positioning flying split aplanat 109 within opening 193 such that an aplanat surface 108 is positioned substantially within 0.1 μm of optical surface 186. Direct illumination beam 133 is totally reflected at aplanat surface 108 and an evanescent field 107 is generated. Evanescent field 107 is optically coupled into split-optical layer 185 to produce a secondary evanescent field 107'. Split aplanat 109 combines with split-optical layer 185 to form an equivalent aplanat, as indicated by dotted lines at 109'. A data bit is represented by the presence or absence of one or more optical artifacts 187 detected within a data surface 184. During the processes of detecting or of producing optical artifacts 187, active layer 183 is translated relative to flying split aplanat 109, as indicated by arrow 19.

The advantage of this configuration is that the greater spacing between head and medium allows for relative movement. The evanescent field is buried in the medium. It then becomes possible to use a high-index material, such as diamond, for the top part of the split head to take advantage of this greater index value and achieve a higher NA, with diamond-like carbon (DLC) coating on the medium.

In the above manner, the TIR surface portion of the flying head is integrated with the medium. The flying head may be part of a drive, or may be a lens array in the housing. The flying height is less than a wavelength such that the coupling between the flying head and the layer in the medium is via the evanescent field, and FTIR. In this way, there is no need for spherical aberration correction, because none is introduced by such a small split. Further, numerical apertures of greater than 1 can occur in the medium. Further still, these numerical apertures can be used for either propagating light immersion imaging, or evanescent field illumination with the attributes already discussed. Others knowledgeable in the relevant art had proposed a split where a portion of the flying aplanatic sphere head is removed, and the optical equivalent added to the medium. However, the flying heights are on the order of many wavelengths, such that (1) all the light is propagating—no use of evanescent fields is made, (2) numerical apertures are restricted to less than one, and (3) the large split and the absence of evanescent coupling introduces spherical aberration which must be corrected for. The see Guerra 1994 patent and 1988 paper showed how the TIR portion can be split from the head, or objective, with the coupling between the two, in one embodiment, being immersion oil, but need not be. Accordingly, in another paper (MRS, 1994), Guerra showed that the coupling between the TIR surface and the next TIR surface can be via the evanescent field (Mica image). So, there are at least two evanescent field couplings here, the first being between the partitioned head and a first layer in the medium (FTIR), and the second and subsequent being between the optical layer (s) and the active layer(s) via FTIR or ATR.

In a near-field optical data storage system where the near-field head is flying, this invention allows the optical data surface (ROM or WORM or rewriteable) to be internal to the medium disc (floppy or rigid) rather than on the surface of the disc. The optical data is protected, and is also very planar, thereby removing the noise contributed by topographic variation of surface data in the near-field and increasing the signal-to-noise of the system. All the advantages of the integral micro-optic media configuration are enjoyed, along with the higher storage density that comes from the numerical aperture being high along the track direction as well as perpendicular to the track direction, and with a disc that is simpler in construction and therefore less costly to make. This split near-field flying head invention is compatible and can be combined with dark-field, dark-field near-field, phase near-field resolution, diffraction near-field, optical track discrimination, sub-pixel synthesis detector, vacuum surface head, multi-level, multi-layer, and other aspects of our near-field storage technology, as well as with the Isis phase change material or topographic pits.

A flying near-field head, which is an optically transparent body in the form of a prism or, preferably, an aplanatic sphere that is flying at substantially sub-micron height proximal to a disc or other geometry surface, is disclosed in our 1987 patent as well as later patents from others (Stanford, IBM, Matsushita). Typically, the head is illuminated beyond the critical angle to generate an evanescent or near field which is then used to write on and read an optical data surface immersed in the field.

In the present invention, the near-field head is physically split into two parts along a plane parallel to the total reflection surface. The larger part may be considered the refractive element, and the remaining thin plate part contains the total reflection surface. The two parts are placed very close together, without touching, so that they are optically coupled by the evanescent field between them. The thin plate part is then extended and made integral to the medium disc, so that there can be relative movement between the remaining head and disc, and thus flying. At flying heights of less than 0.1 micron, the coupling loss is minor and tolerable. The thin plate may be polycarbonate cut from a web, or may be a diamond-like carbon or other material layer for higher index of refraction and better durability. The thin plate and flying head are of like indices of refraction.

The near-field and the optical data surface(s) are internal to the disc, with the robustness and precision control inherent to that configuration. However, here only the bottom planar portion of the optic is integral to the disc, while the refractive part is flying. In this sense it is similar to the patented flexible transducer, in which the bottom total reflection surface is a separate flexible sheet placed on the sample, except that in that case the coupling of the sheet to the refractive optic in the objective is with oil immersion, while in this case the coupling is via the evanescent field from the flying head. Thus an evanescent field is generated twice, once at the head/medium interface, and then at the medium top sheet/recording layer interface.

Now, the head is flying above a very smooth polycarbonate or other material planar surface so that flying height is much more uniform. Also, the optical data layer is no longer on the surface, vulnerable to head contact, finger contact, or other hazards. Further, in the case of phase change data layers, the phase change material is deposited against the internal smooth polycarbonate or other surface (there may be other layers of other refractive indices deposited first) so that there is no topographic noise source. Full resolution inherent to a discrete flying near-field head is enjoyed along with the robustness of the integral micro-optic media, but without the difficulty of making such media. No storage area is lost to field-of-view.

Figure 33:
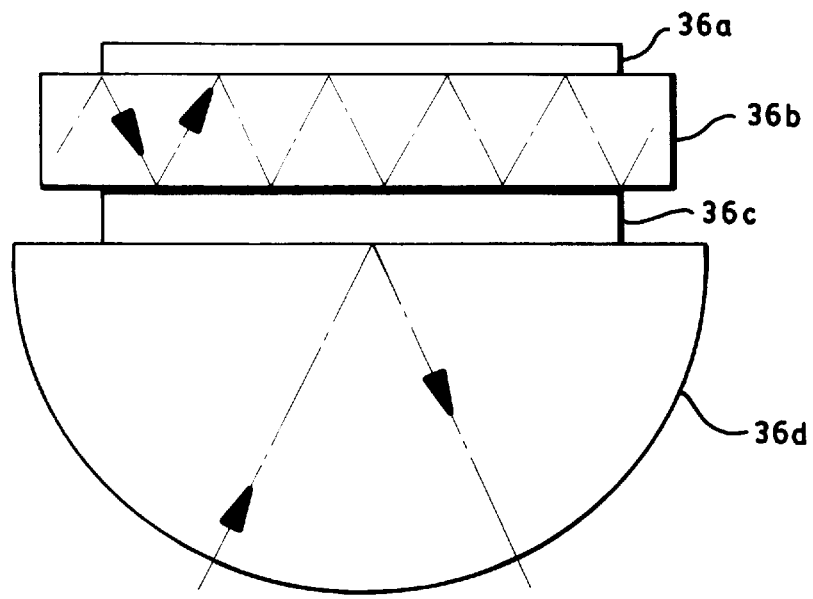
FIG. 33 is a diagrammatic cross-sectional view of a resonant structure used in conjunction with a conventional aplanatic lens.

Resonant structure:

It is well known in the relevant art that evanescent field 80 can be enhanced by orders of magnitude with a resonant structure 34. Typically, resonant structure 34 comprises two layers added to the total internal reflection surface of the near-field optic, such as a prism or aplanatic sphere 31, for example. For a prismatic element comprising a material having an index of refraction of 1.5, one added layer will comprise a lower index of refraction (e.g., 1.0) and the other layer will comprise a higher index layer waveguide of over 2.0. An absorber adjacent to the high index waveguide will exhibit enhanced absorption. This technique and structure is well known and is used in spectroscopy, for example. Harrick shows such a structure, seen in FIG. 33, comprising an absorber layer 36a, a cavity film 36b comprising a high-index material such as silicon, a film reflector 36c comprising a material such as quartz, and a hemicylinder 36d. Yariv and Yeh discuss such resonant structures in depth. Guerra 1994 patent claims a resonant layer structure in combination with a flexible transducer for use in photon tunneling microscope devices, which utilize the evanescent or near field. Guerra additionally claims a resonant structure with a flying near-field head and also integral to a medium, both for optical data storage in 1997 patents, but in combination with phase controlled evanescent fields. Kino shows a thin film on top of the active recording layer (1992 optical data storage patent) but the film is not claimed for resonance, and is of an index matching that of a flying head.

Here, the resonant structure may be either part of the near-field optical array integral to the cartridge, or may be integral to the medium proper. In either case, an advantage gained is the large enhancement of the near-field for much higher signal to noise ratio SNR and absorption. Thus, even very small optical effects (polarization, refractive index, or other changes) in the active optical data recording layer are amplified.

In an application wherein the micro-optics are configured as part of a housing structure for an enclosed optical medium, another advantage is that the optical array may be molded in plastic, with the performance and cost benefits inherent to that technique (e.g., mass production methods to provide complicated aspheric surfaces by which to reduce aberrations). However, because the waveguide layer in the resonant structure (which is added to the plastic optical array with the usual vapor deposition techniques) is of a significantly higher index, the spatial resolution and thus areal density of a higher index near-field optic are enjoyed.

In the case of the resonant structure added to the medium proper, the active optical layer is protected by the added structure from environmental damage. In addition, the application of these layers typically has a smoothing effect on the topography of the active optical layer, in the case of MO or phase-change materials, for example, thus reducing the noise from that factor. The relative refractive indices of the layers, and their optical thickness, as well as the incident illumination angle and wavelength, are optimized in well known relations for resonance conditions, with many possible variations which are outside the scope of this invention. Coherence is required for this resonance.

Alternatively, a surface plasmon resonant field (which also decays exponentially) may be formed when a layer of about 200 angstroms of aluminum, gold or silver, disposed between the optical layer and the active layer, is optically pumped by the evanescent field, and can achieve at least ten times the sensitivity of the evanescent field alone because resonance is easily "detuned" by small changes in the adjacent optically active layer. Ref: Otto.

Further Embodiments

As was disclosed above, to convert evanescent field 39 back into propagating, it is required that one is close to the surface with i) a high refractive index dielectric material, or ii) a diffraction grating with grating period similar in size to the artifact spatial period. The more evanescent the field (i.e., the smaller the optical artifacts), the higher the refractive index that is required. Ultimately, there is a practical limit (imposed by the index of refraction of available materials) of about 2.4 in the visible spectrum to about 3.5 in the near infra-red spectrum.

Conversion by diffraction, on the other hand, is limited only by the diffraction grating spatial period. In this case, the diffraction grating period is less than the illumination wavelength $\lambda$, where the grating can be a phase grating, an amplitude grating, or an index grating.

The use of evanescent fields generated by diffractive structures for optical heterodyning beyond the limitations set by the light wavelength and refractive index has been disclosed before in Refs. 1–3 and particularly regarding optical data storage capacity in Refs. 4 and 5. Ref Guerra 1995 APL paper, and '97 phase patent. Any heterodyning technique responds best to global (i.e., multi-element), or semi-global, changes rather than local changes (i.e., a single element) in either the reference or unknown frequencies, where an element is a single line pair in the case of a grating, for example.

Encoding diffraction near-field information:

This is a preferred method of making use of the super-resolved optical storage capacity of diffraction-born evanescent field optical heterodyning disclosed previously.

A reference frequency in the form of a substantially sub-wavelength optical grating placed within the evanescent field distance to an optical storage medium replaces the electronic reference frequency now used in analog optical video storage, thereby allowing optical data to be stored at similar substantially sub-wavelength dimensions.

Recording and playback of video images (and soundtrack) requires enormous data storage capability that is best accomplished with a frequency modulation (FM) analog readout and heterodyning technique. On the successful laser video discs, for example, the information is stored optically as pits of constant length in the track direction, but whose pitch varies about some nominal pitch. The analog signal thus generated is heterodyned with an electronic signal of the constant nominal pitch, or frequency. (Audio, with the less stringent storage demand, is encoded digitally as pits of varying length.)

Figure 34A:
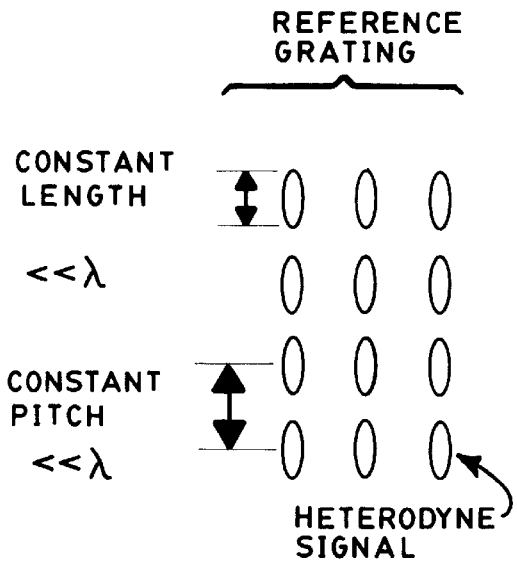
FIG. 34 illustrates a storage medium comprising a series of pits of constant length and pitch against which a recorded pit pitch varies along the track causing a heterodyne signal to vary.
Figure 34B:
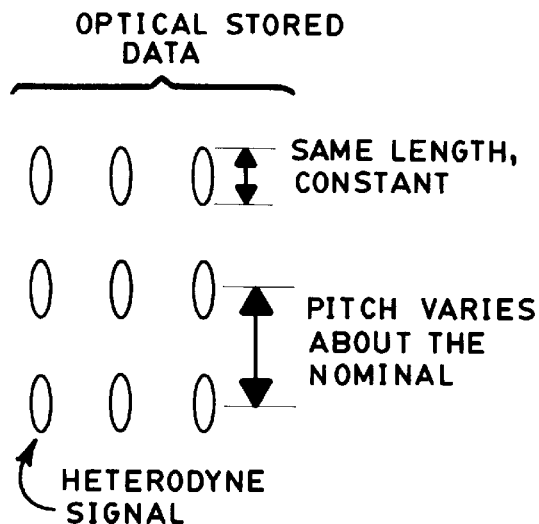
Figure 35A:
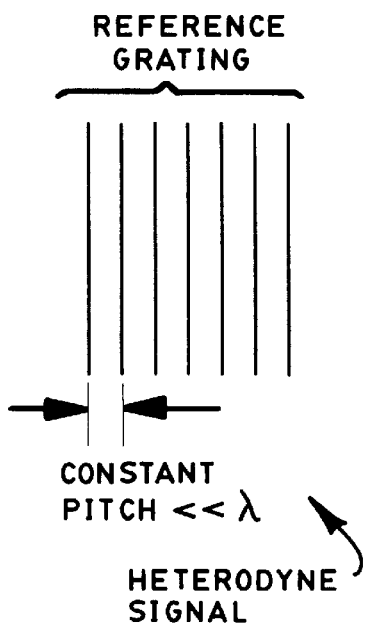
FIG. 35 illustrates a storage medium comprising a simple parallel line pattern of constant pitch with recorded lines varying in pitch perpendicular to track direction.
Figure 35B:
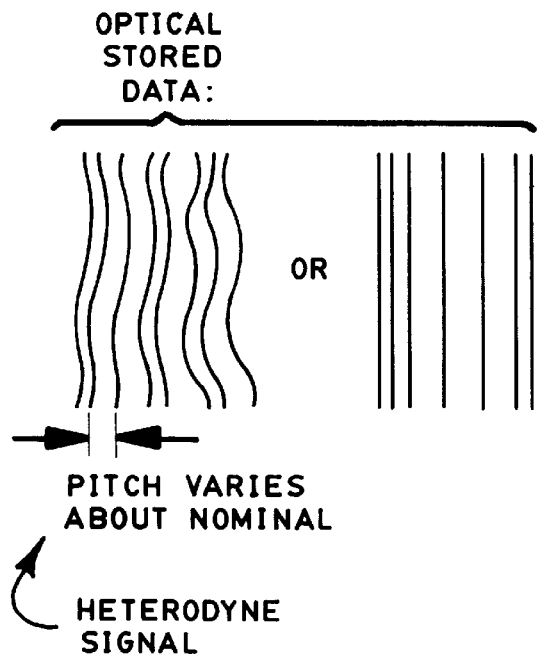

In the present invention, the reference electronic signal of constant frequency is replaced with a reference evanescent field. This is accomplished with a grating whose period is smaller than the illumination wavelength. The reference grating can take at least two forms. The first would be a series of pits of constant length and pitch, illustrated in FIGS. 34A and B, against which the recorded pit pitch would vary along the track, causing the heterodyne signal to vary. This is the closest evanescent, or near-field, analog to what is practiced now, except that it is all optical and extends the storage density a magnitude or more. The second reference pattern is a simple parallel line pattern of constant pitch, illustrated in FIGS. 35A and B, with the recorded lines varying in pitch perpendicular to the track direction. The typical track pitch of laser discs is about 1.6 microns (DVD is less). As shown in Ref. 4, a track pitch of 0.1 microns has been easily demonstrated in the evanescent field. A track pitch of 0.05 microns is certainly attainable, so that even allowing for a redundancy of about 3 tracks, required for a good signal-to-noise in the heterodyning, yields 0.15 microns, or a factor of ten over the current technique. Soundtracks can be recorded by modulating the grayscale of the tracks, or other dimension, as is done now.

This reference sub-wavelength grating may be in the form of topography added to the total reflection distal surface of a discrete flying optical head, or may be integral to the optical recording medium itself. The sub-wavelength diffractive grating may be part of the optical layer in the medium (as in FIG. 10, for example) and may be illuminated with either propagating or evanescent illumination. There may also be a second reference sub-wavelength diffractive grating disposed between the active layer and the optical layer. Writing with a diffraction-borne near-field requires the phase control of the evanescent field as taught in U.S. Pat. No. 5,666,197 issued to Guerra.

As can be appreciated by one skilled in the relevant art, any of the above-described embodiments may comprise one or more additional features as may be desired to enhance implementation of the disclosed invention. For example, the cartridge may have internal non-woven fabric wipers to keep the flying interface clean, and may have the usual sliding shutter to protect the integral micro-optic window, as is known in the art. Similarly, abrasion resistant optical hardcoats such as diamond-like carbon (DLC) can be applied to all exposed and tribological surfaces, such as the medium proper, both side of the integral micro-optic array in the cartridge, and the top surface of the micro-optic integral to the medium proper. Further, a head or back plate opposite the medium from the flying integral near-field optics may be provided to facilitate proximity flying.

Figure 36:
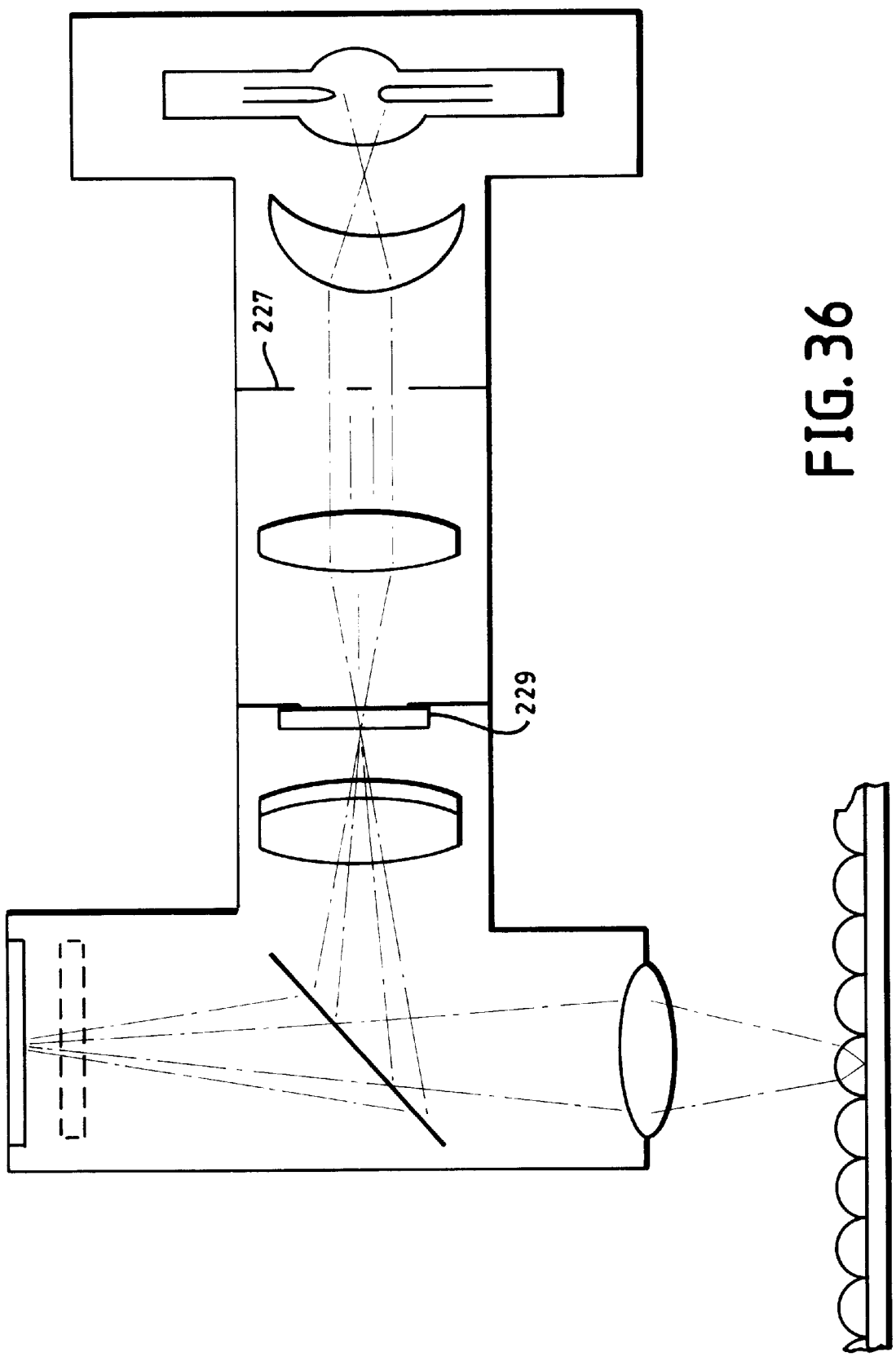
FIG. 36 is a diagrammatical cross-sectional view of an optical storage system reader/writer illustrating placement of an annular aperture, or a laser diode array, or a mask, when used for various methods of whole-field writing.

Critical angle method:

In this method, optical artifacts are formed and read when total internal reflection is locally frustrated or locally enabled by change in the refractive index of the base or active layer, and illumination and/or imaging is restricted to just at the critical angle. This method is sensitive to changes in index of refraction occurring out to the third decimal place. Changing incident and imaging angle slightly switches channels to whole new set of data at a different index and corresponding critical angle. The illumination can be restricted to the immediate neighborhood of the critical angle by placing an annular aperture 227 in the illuminator, as shown in FIG. 36. When used in wholefield writing, a laser diode array 229 may be emplaced as shown. Alternatively, laser diode array 229 may be replaced by a mask (not shown) when used for lithography or other such methods of whole-field writing.

Principal Angle Method

The s- and p-polarization components have generally different phase $\alpha_\perp$ and $\alpha_\parallel$ respectively:

$$\alpha_\perp \equiv \pm 2i\tan^{-1}(v/u) \qquad (5)$$
$$= \pm 2\tan^{-1}\frac{\mu\beta}{\cos\theta}$$

$$\alpha_\parallel \equiv \pi \pm 2\tan^{-1}\frac{\beta}{\mu\cos\theta} \qquad (6)$$

where $i \equiv \sqrt{-1}$, $\lambda_o$ is the freespace wavelength of the illumination, $\beta = (N^2 \sin^2\theta - 1)^{1/2}$, $\lambda_1$ is the wavelength in medium 1, and $\mu = n_2/n_1 \equiv n_{21} \equiv N$, the ratio of the indices of refraction in medium 2 and medium 1, respectively.

Equations (5) and (6) indicate that phase shifting of the incident illumination can be accomplished in a number of ways that include wavelength shift, incident angle shift, azimuthal incident angle shift, polarization shift, or shifting of the incident phase in the Z axis. The illumination may be coherent, or simply filtered white light. The method used in some interferometer microscopes, for example, can be used, where piezo-controlled nanometer physical manipulation of the wavefront phase is effected, which has the advantage of decoupling phase shift from amplitude variation. All this is prior art, described in (ref 1997 Guerra phase patents).

The difference in (5) and (6) results in the elliptical polarization seen in totally-reflected illumination. There exists a Principal angle at greater than the critical angle and less than $\pi/2$ where the two polarizations are equal; in this sense it is complementary to the Brewster angle for propagating illumination.

Adjusting the aperture in the illumination such that only illumination at or near the principal angle reaches the active optical layer will result in the highest sensitivity to induced or existing polarization differences, representing optical data, in the optically active layer.

Systems:

Objective lens 111 is preferably articulated to enable motion in several degrees of freedom such as transverse motion, longitudinal focusing, and tilt. Although prisms are the preferred embodiment, aplanats can be used and articulating the objective lens would increase the field of view for the case when optics are aplanatic and integral to the medium proper.

The integrated micro-optics in either form (part of medium proper or part of medium cartridge) could be read with a substantially conventional radially actuated traversing head/objective, and still enjoy a degree of whole-field and multi-track imaging and the resultant attributes described earlier.

The objective can be a conventional DVD objective, but a more optimized system would include an aspheric objective that corrects for the anamorphic optics of the integrated micro-optics in the medium proper, and corrects for the spherical aberration and astigmatism introduced by the substitution of prisms for aplanats. Also, the optimized objective may be bifocal, with the central part of the numerical aperture corresponding to the NA less than 1 at the active optical layer focused on the lands between the truncated prisms. These lands may contain servo tracking structure spaced about 0.9 microns apart.

The micro-optics integrated with the medium proper can be typically anywhere from 5 microns to 50 microns or more in pitch, with the data tracks on the order of 0.1 micron or so, so each element of the micro-optic looks at many tracks.

However, the integration of micro-optics and the medium allows the opportunity for an improved way of reading and writing optical data which reduces or eliminates the need for radial actuation, and ultimately, even the need for spinning circular media and data tracks.

Radial actuation reduces the speed of random access of data. Additionally, in systems that utilize a flying head, whether near-field, optical, magneto-optical, or magnetic, most head crashes and resulting data loss occur during radial movement of the head.

For whole-field imaging, a secondary array of objective optics may be used in conjunction with the integrated array. Similarly, the detector is not a single element but instead may be an array of elements, with a single or multiple elements dedicated to each of the optical array elements. Just as with the integrated micro-optic array, the optics in the secondary array can be optimized by aspherizing and can have optical power on either side in order to optimize the combined microscopic array system.

If the diameter of the field of view of each of the optical elements in the array is 50% of the physical diameter of each optic, then it follows that at least two rows of elements are required, staggered such that full coverage is achieved. Additional rows may be included for more highly optically optimized coverage, or the elements may have discrete focal properties to eliminate the need for focus actuation.

If the detector array is skewed with respect to the optical array, or if the elements themselves are offset by a known amount, sub-pixel resolution results and then the secondary optical array can even be eliminated.

For writing, the power levels provided by coherent laser diodes are still required at this time for the existing active optical materials. However, writing multiple tracks can be achieved through the same secondary objective optical array if a laser diode array is used in conjunction with it.

Array Objective

So far, it has been assumed that there is a conventional objective in the drive into which the medium with integral optics is inserted. Further, the objective associated with the drive may not be conventional, but may be fully articulated to include tilt, and may have a bifocal design to better image the servo tracks. Further still, the objective associated with the drive may be an array of close-packed and staggered lenses arranged so as to cover the entire area of the medium when the medium is spinning, or when the medium is stationary and smaller.

However, the objective in the drive may be eliminated by transferring its optical functionality to the optics integral to the medium. This may be done for either the evanescent field illumination embodiment or the propagating illumination embodiment.

To this point, the optics have been integral to the medium proper, or to a cartridge in which the medium proper is housed. In the case of propagating light, when the optics were integral only to the cartridge, they served the purpose of working with the external drive objective to increase numerical aperture to near 1. Here, the optics are again integral to the cartridge, but serve as stand-alone objectives having a numerical aperture of about 0.6, in order to eliminate the need for the drive objective.

A better embodiment, however, is to use integral optics both at the medium proper and at the cartridge, so that the two sets of optics work together as a high numerical aperture objective. Whether the illumination is propagating or evanescent, the numerical aperture will be greater than 1 and typically 1.3 or higher.

The optics integral to the media are preferably, as before, circumferential in form, while the optics in the cartridge are either an array of close packed lenses, staggered so that their fields of view overlap and completely cover the medium radius, or an array of lenticules, skewed with respect to the tracks in the medium so as to cover the entire data area (see FIGS. 29A and 29B).

The detector can be a single detector that is actuated radially to receive the signal from the various elements in the optical array, or may be a small detector array that is similarly actuated. However, a preferred detector arrangement, in which radial actuation is eliminated, follows.

Skewed Detector Array

Figure 37:
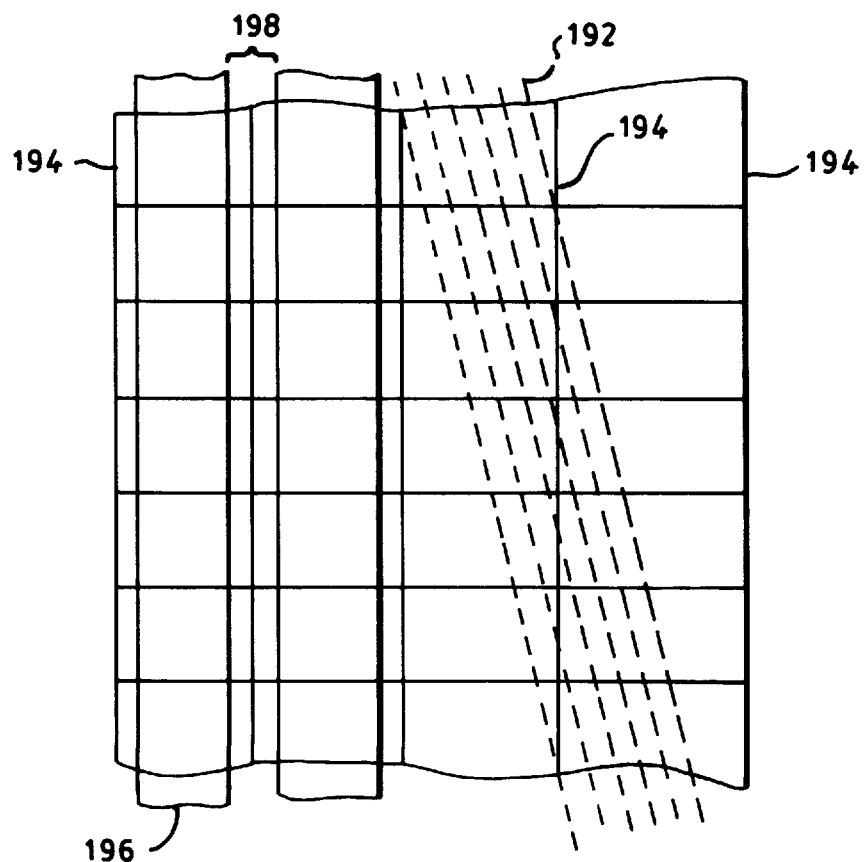
FIG. 37 is a diagrammatical plan view of a detector array placed along and oriented parallel to the longitudinal axis of an optical element, in the focal plane of the optical element, and disposed over data tracks.

Whether the optical array is integral to the medium cartridge or is in the drive, and whether this array is combined with additional integral optics in the medium proper, the resulting image from each of the array elements contains information from many data tracks simultaneously. A detector array may be placed along and oriented parallel to the longitudinal axis of the optical element, in the focal plane of the optical element, as seen in FIG. 37. Each of the individual detector pixels 194 in the array then receive the signal from a given data track 192 within the image from the optical element. Therefore, by monitoring the signal from each of detector pixels 194 either switching between one at a time or several at once, the data from multiple tracks can be read simultaneously and at high speed.

For the higher track pitches reached with the evanescent field illumination, for example, the size of the detector pixel should be as small as possible. At present, the CCD (including CMOS) industry makes pixels as small as 6 microns square. However, substantially sub-pixel resolution can be synthesized by aligning the boundary between two detector columns with the optical axis of the optical array element, such that each of the optical artifacts in the image plane of the optical element is swept in a skewed trajectory across the detector boundary. By analyzing the signal output from several contiguous detector pixels in those two rows, and because the amount of skew between the detector columns, optical array element, and data track are preset and known, optical artifacts that are significantly smaller than the detector pixel are detected and resolved from neighboring optical artifacts.

Pixels in a CCD, CMOS, or other detector are usually arranged in an architecture of straight rows and columns. Resolution of such a detector or display with this architecture is determined by, and on the order of, the size of the pixel in each axis relative to the image or other light pattern presented to it or displayed. Should a part of the light pattern overlap several pixels, the centroid of the light pattern can be determined to a fraction of a pixel. However, should a light pattern be smaller than a pixel, it is not resolved whether it falls within a pixel or straddles plural pixels.

In the case of detection, the skewed pixel columns allow the kind of sub-pixel centroid resolution described above, except that the sub-pixel sized object itself is resolved rather than its centroid alone.

Because the size of the offset from one pixel to another is known, the relative signal levels from each of the pixel "channels" can be compared and analyzed to detect, resolve, and determine the size of the sub-pixel light pattern as it traverses the terminator boundary between the neighboring pixel columns. The optimum way of doing this depends on whether speed or resolution or noise reduction is the over riding concern. The pixel to pixel analysis algorithm can be as simple as (A−B)/(A+B), in the typical quad-cell detector mode, or can be much more sophisticated as iterations involving a larger number of pixels is involved.

A mask 196 may be added that is an array of apertures centered on the pixel column boundaries. The width of the apertures is on the order of the resolution required. Such a mask 196 may also be centered on the pixel columns, but the benefit of the pixel detection arithmetic is eliminated.

This method and means is somewhat analogous to a Vernier scale, which is to say a Moiré or heterodyning technique, where resolution on a scale much smaller than the fiducials on the Vernier or the grating pitch in Moire is achieved. However, it also shares elements of the centroid resolution of the quad-cell, and even some elements of a knife-edge approach.

This skewed array architecture can be applied to an entire 2-D detector chip, or to a bi, tri, or multi-linear array. In optical data storage, reduces or eliminates the need for servo tracks (acts as wobble pit servo); reduces or eliminates radial movement and actuator in optical drive: a tri-linear array of about a 20 mm length would cover the entire area of a spinning 50 mm (e.g., Polaroid Mini Disc), thereby making for a drive nearly the size of the medium with reduced mechanisms and cost, and allows parallel data readout, multi-channel encoding, and extremely fast readout and data transfer rates. Where smaller storage capacity is sufficient, a staggered architecture CCD or CMOS detector could even eliminate spinning the medium as well, so that a rectangular data chip could be read out directly (with or without near-field).

A further advantage can be gained by adding a small fixed slope to the detector plane and/or to the optical array plane, relative to the plane of the medium, such that the center point of the slope is vertically at and intersects the plane of best focus. This eliminates the need for a focus servo because the slope is calculated such that the amount of possible defocus from vertical movement of the medium or other reasons is encompassed by the total slope. In other words, the optical artifact will always be in focus somewhere along the detector column length.

Whole-Field Imaging

Figure 38:
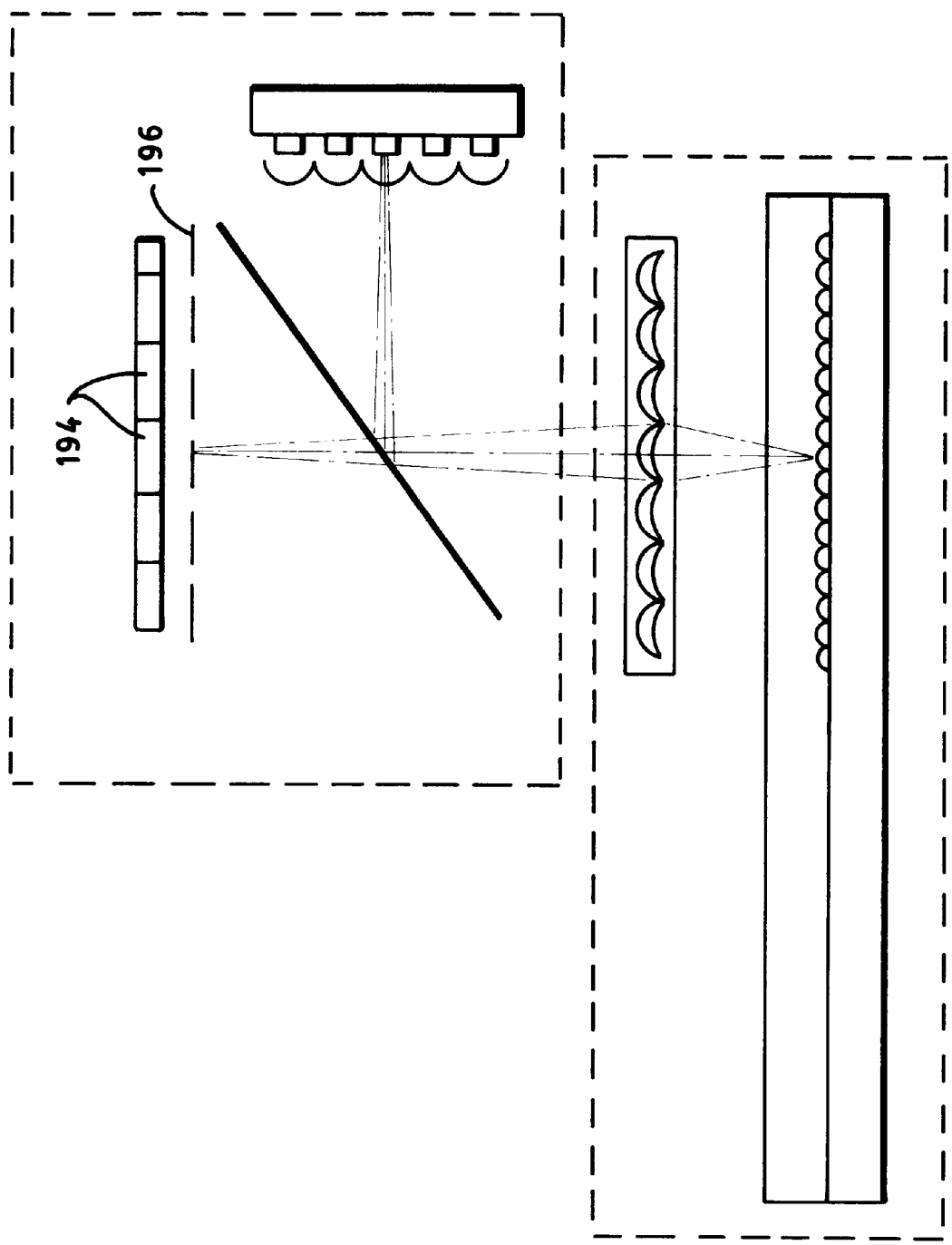
FIG. 38 is a diagrammatical cross-sectional view of a whole-field imaging system in accordance with the present invention.

Whole-field imaging can be used in many ways as exemplified by the system diagram of FIG. 38. New encoding schemes in which multiple tracks are used together would allow even more density in data storage. With the existing encoding, multitasking from the same disc is possible, as several software programs can be read from the same disc at the same time. Rotation speed can be reduced because data transfer is occurring from several tracks at once, rather than having to wait for the disc to progress a full rotation.

Therefore, data transfer rates can be as high or higher than hard disk drives, for example. At present, removable media storage devices that are not based on the Winchesters hard disc technology are much slower in data transfer times, so they cannot compete for that part of the desktop PC market.

The whole-field imaging advantage brought by the integrated micro--optic array is best realized with near-field illumination and optics. However, even propagating illumination techniques will enjoy a good increase in effective NA up to but less than 1 for the media cartridge integration, and more for integration to the medium proper.

For some applications, data can be read from a non-rotating medium, whether that medium is circular in form or rectangular or other, by combination and extension of this invention of integrating micro-optics with the medium and the system combination with a secondary array of optics and a multi-element areal detector array. The data is scanned from the disc without mechanical movement of any kind, by reading out the detector array signal. Writing would require a similar array of laser diodes and at least a linear movement relative between the medium and the laser diode array. When optical active layers become more sensitive, however, a whole-field approach can be applied to the writing aspect as well, where a whole-field illumination source is spatially modulated by an optical gating device such as a liquid crystal matrix, placed at the focus plane conjugate to the detector plane.

In the embodiment of the optical array with a non-actuated single illumination source for reading and or writing, additional optics not shown are inserted between the source and the array in order to make the system optically telecentric. Otherwise, a multiple source array may be used.

Other applications:

In addition to optical data storage applications, the integration of micro-optic arrays with a surface or photo-active surface has other applications not anticipated prior to this. The micro-optic array can be flexible, semi-rigid, or rigid.

For example, in the mastering of the stamper for ROM discs, integration of a film of micro-lenticulars with the photoresist would increase the mastering resolution, allowing a wider choice of laser wavelengths and therefore a wider variety of photoresists. The micro-lenticulars would be removed along with the resist later in the process.

Resolution in micro-lithography of, for example, micro-electronic circuits and devices would be improved by integration of a micro-optic array with the photo-resist coated semiconductor wafer, thereby allowing smaller line widths and more powerful, faster chips, without resorting to a single, costly, large immersion objective. In this application, the micro-optics could be aligned with the line pattern itself.

Similarly, a micro-optic array could be applied to a finished processed wafer in order to measure line widths with high resolution. The micro-optic array would preferably consist of micro--aplanatic lenses used either in immersion mode or in near-field mode, and would allow the same or better resolution as an oil immersion objective but without the immersion oil, which could contaminate a clean room and ruin an expensive micro-electronic wafer.

That same micro-optic array can be integrated to many surfaces and samples other than wafers, so that even inexpensive microscopes with, for example, an objective with NA of 0.65 or so would be converted to immersion microscopes with NAs of better than 1 and typically NAs of about 1.3, without oil and with the high working distance of the NA 0.65 objective. While an immersion objective lens can cost several hundred to several thousands of dollars, the flexible micro-optic arrays would be mass-produced by, for example, compression molding or web-embossing, and so would be repeatable yet inexpensive and disposable.

Flexible immersion lenses:

The present invention removes the need for immersion oil in photon tunneling microscopy as well as immersion microscopy, eliminates the expensive immersion objective, and allows photon tunneling with a dry, long working distance, lower NA objective.

In the Guerra flexible transducer patents of 1994 and 1996, the rigid total internal reflection surface is eliminated and replaced with a disposable, inexpensive, precision transducer. However, an oil immersion objective must still be oil-contacted to the transducer. This invention takes the flexible transducer a step further, and eliminates the oil immersion objective by incorporating integral microaplanatic lenses, arranged in a close-packed array into the upper transducer surface. With this flexible optical sheet placed on the sample in the teaching of the transducer patents, a dry long working distance objective of numerical aperture 0.6 will function together with the integral aplanatic lenses as an oil immersion objective of NA 1.25 or higher. In this way photon tunneling, or even just immersion microscopy, is accomplished without oil and with a large working distance. Of course, what is lost is the ability to move the aplanat with respect to the sample, but with the close packed array most of the sample will be made visible by moving the dry objective relative to the micro-lenses.

This flexible lens array brings affordable photon tunneling and immersion microscopy to the classroom, for example, or to applications where the immersion oil is thought to be a problem, such as in the semi-conductor industry when used for lithography or metrology. It is easily molded or embossed into web, or the lenses can be holographic elements.

The present invention removes the need for immersion oil in photon tunneling microscopy as well as immersion microscopy, eliminates the expensive immersion objective, and allows photon tunneling with a dry, long working distance, lower NA objective.

In the Guerra flexible transducer patents of 1994 and 1996, the rigid total internal reflection surface is eliminated and replaced with a disposable, inexpensive, precision transducer. However, an oil immersion objective must still be oil-contacted to the transducer. This invention takes the flexible transducer a step further, and eliminates the oil immersion objective by incorporating integral microaplanatic lenses, arranged in a close-packed array into the upper transducer surface. With this flexible optical sheet placed on the sample in the teaching of the transducer patents, a dry long working distance objective of numerical aperture 0.6 will function together with the integral aplanatic lenses as an oil immersion objective of NA 1.25 or higher. In this way photon tunneling, or even just immersion microscopy, is accomplished without oil and with a large working distance. Of course, what is lost is the ability to move the aplanat with respect to the sample, but with the close packed array most of the sample will be made visible by moving the dry objective relative to the micro-lenses.

This flexible lens array brings affordable photon tunneling and immersion microscopy to the classroom, for example, or to applications where the immersion oil is thought to be a problem, such as in the semi-conductor industry. It is easily molded or embossed into web, or the lenses can be holographic elements. Polaroid is world-class in all of these technologies.

If in the future the pixel size in CCD arrays is made smaller to the point where optical resolution is exceeded, a micro-optic array integral to the CCD would increase the resolution accordingly. (Now just used for fill efficiency, back thinned too.)

Recording media can be for optical data recording or for image recording.

Harmonic generation

For most of the evanescent field applications discussed thus far, the wavelength, or quasi-wavelength, of the evanescent field is the same as that of the parent wave in the denser medium, which in these cases are the integral micro-optics or the integral resonance structure. The frequency of the evanescent field, however, is invariant with the index of the medium. If, however, the total internal reflection occurs within a photo-refractive non-linear material, second harmonics can be generated when the incidence of the light it close to the critical angle, such that the frequency of the evanescent field is doubled. In this case, it becomes possible to consider other active optical layers in which the mechanism for change is molecular in nature, in the form of photo-dissociation of bonds. (This can be seen to have impact on a scope wider than optical data storage, if, for example, the integral near-field optics are used with water as the active optical layer and the illumination is sunlight made sufficiently coherent, such that the hydrogen to hydrogen bonds in the water are broken to release hydrogen for fuel (with desalination a useful byproduct when ocean water is used).) Further discussion is provided in Bloembergen and Lee.

Vertical Storage: Multilayer, Multilevel

Integrating the near-field optics with the medium also, by definition, makes the near-field part of the medium. The stability that this imparts compared to a flying near-field head that is part of the drive rather than the medium, for example, facilitates the full use of the evanescent field component. Thus, for example, diffraction-born evanescent fields with their very short decay become more practical to use, as already discussed. The stable evanescent field may also be better applied for vertical storage in two forms. The first is multilevel, where varying the intensity of the illumination causes a corresponding variable change in the optical bit in the active optical layer, such that rather than a binary-encoded data set one may encode in many levels. The high optical contrast (signal to noise) that results from evanescent field illumination of, for example, either magneto-optical or phase change active layers, allows many more levels to be achieved than with the normal propagating light for reasons stated earlier.

Figure 39:
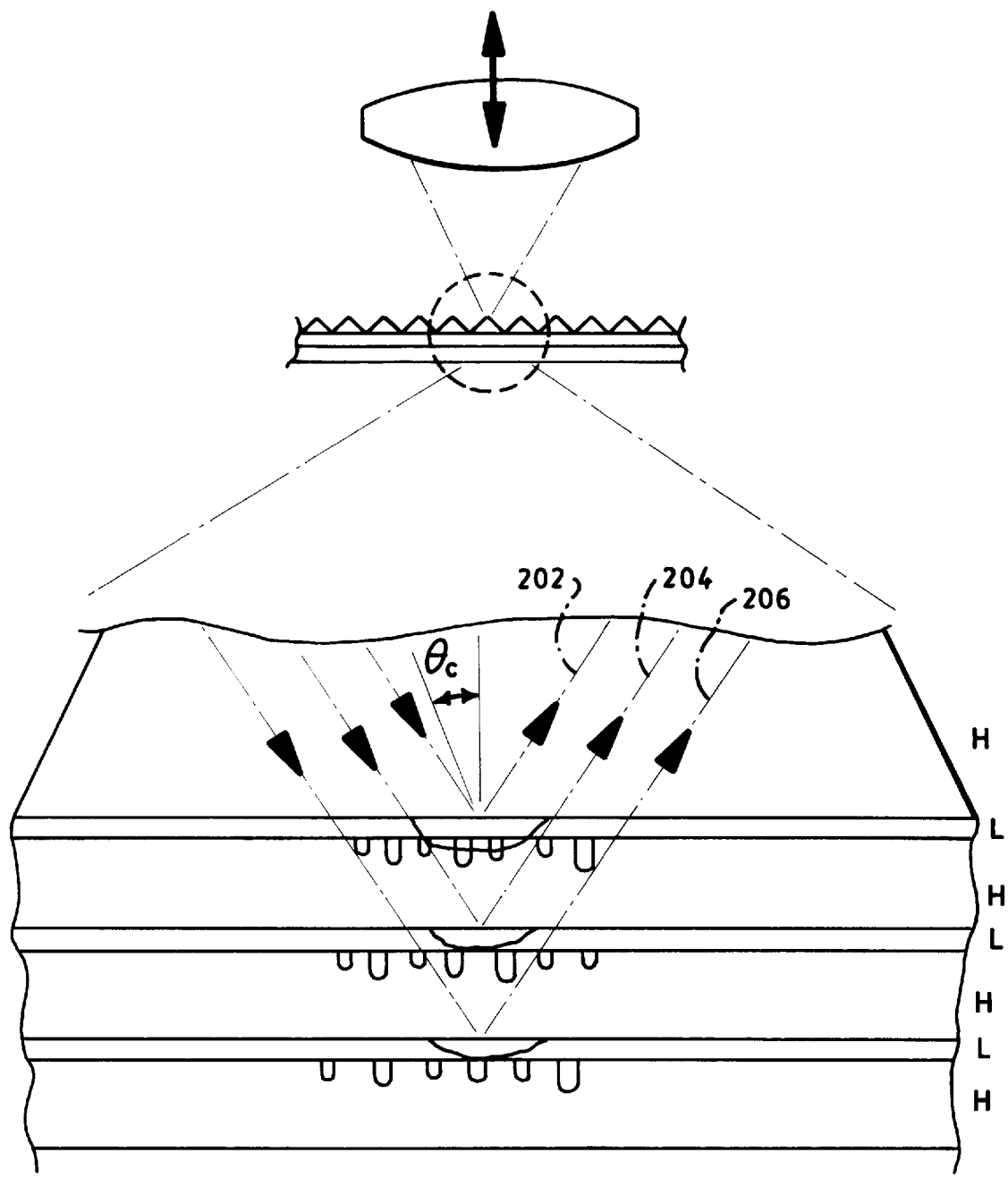
FIG. 39 is a diagrammatical view of a form of vertical storage, utilized with integral evanescent fields and referred to as multi-layer, wherein the total reflection interface at which the evanescent fields arise have been replicated vertically with the addition of layers of high-low-high refractive index materials to the storage medium; and, FIG. 40 are oscilloscopic traces obtained from signals returned from a storage medium having a four-layer configuration.

A second form of vertical storage made possible with the integral evanescent field is called multi-layer (see FIG. 39), because the total reflection interface at which the evanescent field arises can be repeated vertically with the addition of subsequent layers of high-low-high refractive index materials, where the refractive index may even be complex if the absorber is thin enough. In this way, refocusing the external objective lens or array causes information stored at each of these total reflection interfaces to rapidly come into focus. The number of vertical data layers is restricted by the scattering properties of the layers, particularly the active layers, in addition to the accumulation of unfocussed light from the nearest active layers, so that in practice the signal to noise ratio is too low if four or more active layers are used. In the example provided, three signals 202, 204, and 206 are returned from three such layer configurations.

Figure 40:
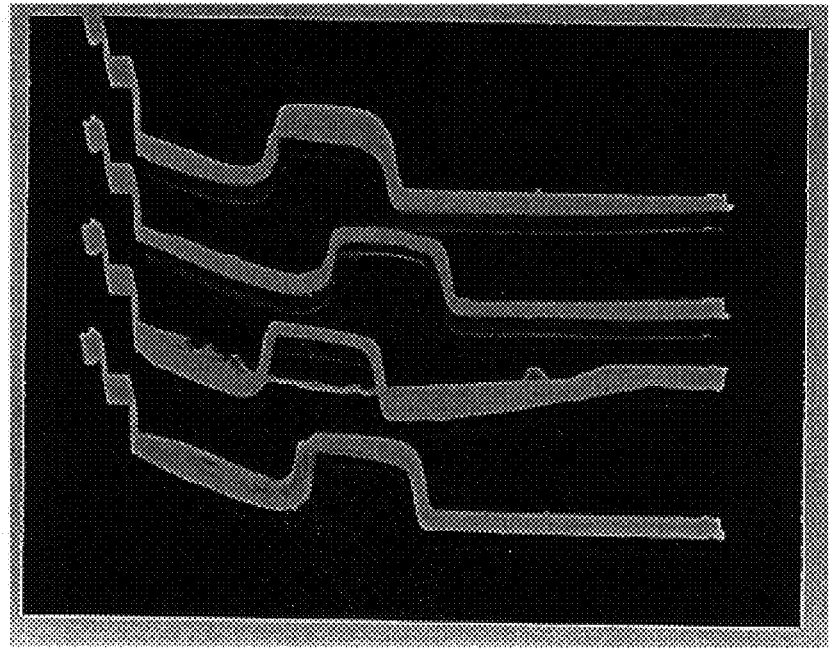

See FIG. 40 for an example of signals returned from a storage medium having a four-layer configuration. Trace 202*t* represents the signal from the first high-low interface, trace 204*t* represents the signal from the second high-low interface, trace 206*t* represents the signal from the third high-low interface, and trace 208*t* represents the signal from the fourth and most distant high-low interface.

If the vertical periodicity of the high-low layer elements is on the order of 20 microns or less, with the low index being less than a micron thick, there is an interesting but unexplained equal splitting of the signal from each of the active layers, rather than the expected progressive splitting, or halving, of the signal from each of the preceding active layers. For greater vertical periodicity, the signal splits as expected such that the signal from the lowest is quite weak. In this case it is useful to make the vertical periodicity non-linear by making the furthest low index layers progressively thinner to compensate for the weaker return signal. A greater vertical periodicity, although adding somewhat to the layer structure complexity, allows better separation of the signal from each of the active layers by the depth of focus of the external objective combined with the integrated near-field optics.

Integral micro-optics can also be used when the method of optical storage is holographic in nature.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A storage medium, suitable for use with an external source of illumination for the storage and retrieval of information, said storage medium comprising:

an optical layer disposed to receive the illumination, said optical layer comprising a plurality of micro-optical elements, each said micro-optical element having a first index of refraction and configured such that illumination incident upon said micro-optic element produces local evanescent field illumination extending from said optical layer, and an active layer disposed to receive said evanescent field illumination, said active layer being responsive to said evanescent field illumination such that a predetermined amount of said evanescent field illumination impinging upon a portion of said active layer produces an artifact within said portion.

2. The storage medium of claim 1 wherein said active layer comprises at least one of the following materials: crystalline phase change material, amorphous phase change material, dye absorber, chalcogenide glass and compounds, polymer, quartz, magneto-optical material, photo-refractive polymer, photo-refractive crystal, photographic emulsion, fluorescent material, photoresist, binary medium, or semiconductor detector array.

3. The storage medium of claim 1 wherein said artifact comprises a change in at least one of the following characteristics of said active layer: index of refraction, scatter, optical phase, polarization, diffraction, refraction, constructive interference, destructive interference, absorption, magneto-optical Kerr rotation, surface topography, chemical structure, mechanical structure (e.g., adhesion), or material phase state.

4. The storage medium of claim 1 wherein said micro-optical element further comprises a prism-like optic.

5. The storage medium of claim 4 wherein said prism-like optic comprises a truncated prism.

6. The storage medium of claim 1 wherein micro-optical element further comprises a lens having curvature in at least one meridian.

7. The storage medium of claim 6 wherein said curvature is aplanatic.

8. The storage medium of claim 6 wherein said curvature is aspherical.

9. The storage medium of claim 1 wherein said optical layer further comprises a resonant structure.

10. The storage medium of claim 9 wherein said resonant structure comprises a layer of material having a second index of refraction.

11. The storage medium of claim 10 wherein said second index of refraction is less than said first index of refraction.

12. The storage medium of claim 10 wherein said second index of refraction is greater than or equal to said first index of refraction.

13. The storage medium of claim 10 wherein said material comprises a metal.

14. The storage medium of claim 13 wherein the thickness of said metal layer is selected such that a surface plasmon resonant field is generated in response to the incident illumination.

15. The storage medium of claim 1 wherein said optical layer further comprises a diffraction grating.

16. The storage medium of claim 15 wherein said diffraction grating has a spatial period smaller than the illumination wavelength.

17. The storage medium of claim 1 further comprising a substrate disposed upon said active layer.

18. The storage medium of claim 17 wherein said substrate comprises one of the following materials: polycarbonate, mylar, glass, acrylic, and polyester.

19. The storage medium of claim 17 wherein said substrate comprises means for providing tracking guidance.

20. The storage medium of claim 1 further comprising a layer of material having a third index of refraction disposed between said active layer and said optical layer, said third index of refraction being smaller than said first index of refraction.

21. The storage medium of claim 20 wherein said material comprises air.

22. The storage medium of claim 20 wherein said layer of material comprises a thickness of dimension less than the wavelength $\lambda$ of the source of illumination.

23. The storage medium of claim 1 further comprising a housing.

24. The storage medium of claim 23 wherein said housing comprises a window.

25. The storage medium of claim 24 wherein said window comprises micro-optical elements.

26. The storage medium of claim 1 wherein said optical layer further comprises means for providing tracking guidance.

27. The storage medium of claim 26 wherein said means for providing tracking guidance comprises secondary optical artifacts.

28. The storage medium of claim 1 wherein said micro-optical element comprises dihedral surfaces.

29. The storage medium of claim 1 further comprising a second active layer disposed proximal to said active layer.

30. The storage medium of claim 29 further comprising a separation layer having a third index of refraction, said separation layer disposed between said active layer and said second active layer.

31. The storage medium of claim 30 wherein said third index of refraction is less than said first index of refraction.

32. The storage medium of claim 1 wherein said active layer comprises means for providing tracking guidance.

33. A storage medium, suitable for use with an external source of illumination, having a wavelength $\lambda$, for the storage and retrieval of information, said storage medium comprising:

an optical layer disposed to receive the illumination, said optical layer comprising a plurality of micro-optical elements, each said micro-optical element having a first index of refraction and configured such that illumination incident upon said micro-optic element produces propagating illumination extending from said optical layer, said optical layer further comprising an interference reference surface, and an active layer disposed to receive said propagating illumination, said active layer being responsive to said propagating illumination such that a predetermined amount of said propagating illumination impinging upon a portion of said active layer produces an artifact within said portion.

34. The storage medium of claim 33 wherein said micro-optical element further comprises a prism-like optic.

35. The storage medium of claim 34 wherein said prism-like optic comprises a truncated prism.

36. The storage medium of claim 33 further comprising a substrate disposed upon said active layer.

37. The storage medium of claim 36 wherein said substrate comprises one of the following materials: polycarbonate, mylar, glass, acrylic, and polyester.

38. The storage medium of claim 36 wherein said substrate comprises means for providing tracking guidance.

39. The storage medium of claim 33 wherein said optical layer further comprises means for providing tracking guidance.

40. The storage medium of claim 39 wherein said means for providing tracking guidance comprises secondary optical artifacts.

41. The storage medium of claim 33 further comprising a second active layer disposed proximal to said active layer.

42. The storage medium of claim 41 further comprising a separation layer having a third index of refraction, said separation layer disposed between said active layer and said second active layer.

43. The storage medium of claim 42 wherein said third index of refraction is less than said first index of refraction.

44. The storage medium of claim 33 wherein said micro-optical element comprises dihedral surfaces.

45. A storage medium, suitable for use with an external source of illumination for the storage and retrieval of information, said storage medium comprising:

a first optical layer comprising micro-optical elements, said first optical layer further comprising a first index of refraction and disposed to receive the illumination and generate an evanescent field illumination therefrom;

a second optical layer comprising a second index of refraction, said second optical layer disposed to receive said evanescent field illumination and generate a secondary evanescent field illumination therefrom, and an active layer disposed to receive said secondary evanescent field illumination, said active layer being responsive to said secondary evanescent field illumination such that a predetermined amount of said secondary evanescent field illumination impinging upon a portion of said active layer produces an artifact within said portion.

46. The storage medium of claim 45 wherein said second optical layer comprises a total internal reflection surface.

47. The storage medium of claim 45 wherein said first index of refraction is substantially equivalent to said second index of refraction.

48. The storage medium of claim 45 wherein said second optical layer comprises a resonant structure.

49. The storage medium of claim 48 wherein said resonant structure comprises a layer of material comprising an index of refraction lower than said first optical layer index of refraction.

50. The storage medium of claim 49 wherein said material comprises air.

51. The storage medium of claim 45 wherein said first optical layer combines with said second optical layer to form aplanatic optical elements.

52. The storage medium of claim 45 wherein said active layer comprises at least one of the following materials: crystalline phase change material, amorphous phase change material, dye absorber, chalcogenide glass and compounds, polymer, quartz, magneto-optical material, photo-refractive polymer, photo-refractive crystal, photographic emulsion, fluorescent material, photoresist, binary medium, or semiconductor detector array.

53. The storage medium of claim 45 wherein said artifact comprises a change in at least one of the following characteristics of said active layer: index of refraction, scatter, optical phase, polarization, diffraction, refraction, constructive interference, destructive interference, absorption, magneto-optical Kerr rotation, surface topography, chemical structure, mechanical structure (e.g., adhesion), or material phase state.

54. The storage medium of claim 45 wherein said micro-optical element further comprises a prism-like optic.

55. The storage medium of claim 54 wherein said prism-like optic comprises a truncated prism.

56. The storage medium of claim 45 wherein micro-optical element further comprises a lens having curvature in at least one meridian.

57. The storage medium of claim 56 wherein said curvature is aplanatic.

58. The storage medium of claim 56 wherein said curvature is aspherical.

59. The storage medium of claim 45 further comprising a metal disposed upon said second optical layer.

60. The storage medium of claim 59 wherein the thickness of said metal layer is selected such that a surface plasmon resonant field is generated in response to the incident illumination.

61. The storage medium of claim 45 wherein said second optical layer further comprises a diffraction grating.

62. The storage medium of claim 61 wherein said diffraction grating has a spatial period smaller than the illumination wavelength.

63. The storage medium of claim 45 further comprising a substrate disposed upon said active layer.

64. The storage medium of claim 63 wherein said substrate comprises one of the following materials: polycarbonate, mylar, glass, acrylic, and polyester.

65. The storage medium of claim 45 further comprising a layer of material having a third index of refraction disposed between said active layer and said optical layer, said third index of refraction being smaller than said first index of refraction.

66. The storage medium of claim 65 wherein said layer of material comprises a thickness of dimension less than the wavelength $\lambda$ of the source of illumination.

67. The storage medium of claim 45 further comprising a housing.

68. The storage medium of claim 67 wherein said housing comprises a window.

69. The storage medium of claim 68 wherein said first optical layer is disposed upon said window.

70. The storage medium of claim 45 wherein said second optical layer further comprises means for providing tracking guidance.

71. The storage medium of claim 70 wherein said means for providing tracking guidance comprises secondary optical artifacts.

72. The storage medium of claim 45 wherein said active layer comprises means for providing tracking guidance.

73. The storage medium of claim 63 wherein said substrate comprises means for providing tracking guidance.

74. The storage medium of claim 45 further comprising a second active layer disposed proximal to said active layer.

75. The storage medium of claim 74 further comprising a separation layer having a third index of refraction, said separation layer disposed between said active layer and said second active layer.

76. The storage medium of claim 75 wherein said third index of refraction is less than said first index of refraction.

77. The storage medium of claim 45 wherein said active layer comprises at least one of the following materials: crystalline phase change material, amorphous phase change material, dye absorber, chalcogenide glass and compounds, polymer, quartz, magneto-optical material, photo-refractive polymer, photo-refractive crystal, photographic emulsion, fluorescent material, photoresist, binary medium, or semiconductor detector array.

78. The storage medium of claim 45 wherein said artifact comprises a change in at least one of the following characteristics of said active layer: index of refraction, scatter, optical phase, polarization, diffraction, refraction, constructive interference, destructive interference, absorption, magneto-optical Kerr rotation, surface topography, chemical structure, mechanical structure (e.g., adhesion), or material phase state.

79. A storage medium, suitable for use with an external proximal source of evanescent field illumination provided by means of an optical element having an index of refraction for the storage and retrieval of information, said storage medium comprising:

an optical layer comprising an index of refraction, said optical layer disposed to receive the evanescent field illumination and generate secondary evanescent field illumination therefrom, and an active layer disposed to receive said secondary evanescent field illumination, said active layer being responsive to said secondary evanescent field illumination such that a predetermined amount of said secondary evanescent field illumination impinging upon a portion of said active layer produces an artifact within said portion.

80. The storage medium of claim 79 wherein said optical layer comprises a total internal reflection surface.

81. The storage medium of claim 79 wherein said optical layer index of refraction is substantially equivalent to the optical element index of refraction.

82. The storage medium of claim 79 wherein said optical layer comprises a resonant structure.

83. The storage medium of claim 82 wherein said resonant structure comprises a layer of material comprising an index of refraction lower than the optical element index of refraction.

84. The storage medium of claim 83 wherein said material comprises air.

85. The storage medium of claim 79 wherein said optical layer combines with the optical element to form an aplanatic optical element.

86. The storage medium of claim 79 further comprising a metal disposed upon said optical layer.

87. The storage medium of claim 86 wherein the thickness of said metal layer is selected such that a surface plasmon resonant field is generated in response to the incident illumination.

88. The storage medium of claim 79 wherein said optical layer further comprises a diffraction grating.

89. The storage medium of claim 88 wherein said diffraction grating has a spatial period smaller than the illumination wavelength.

90. The storage medium of claim 79 further comprising a substrate disposed upon said active layer.

91. The storage medium of claim 90 wherein said substrate comprises one of the following materials: polycarbonate, mylar, glass, acrylic, and polyester.

92. The storage medium of claim 90 wherein said substrate comprises means for providing tracking guidance.

93. The storage medium of claim 79 further comprising a housing.

94. The storage medium of claim 93 wherein said housing comprises a window.

95. The storage medium of claim 79 wherein said optical layer further comprises means for providing tracking guidance.

96. The storage medium of claim 95 wherein said means for providing tracking guidance comprises secondary optical artifacts.

97. The storage medium of claim 79 wherein said active layer comprises means for providing tracking guidance.

98. The storage medium of claim 79 further comprising a second active layer disposed proximal to said active layer.

99. The storage medium of claim 98 further comprising a separation layer having a third index of refraction, said separation layer disposed between said active layer and said second active layer.

100. The storage medium of claim 99 wherein said third index of refraction is less than said first index of refraction.

* * * * *